United States Patent [19]

Nomura

[11] Patent Number: 5,053,888
[45] Date of Patent: Oct. 1, 1991

[54] METHOD OF AND APPARATUS FOR ESTABLISHING HIGHLIGHT AND SHADOW DENSITIES

[75] Inventor: Akihiro Nomura, Kyoto, Japan

[73] Assignee: Dainippon Screen Mfg. Co. Ltd., Japan

[21] Appl. No.: 332,466

[22] Filed: Mar. 31, 1989

[30] Foreign Application Priority Data

Mar. 31, 1988 [JP] Japan ................... 63-80405

[51] Int. Cl.$^5$ .......................... H04N 1/40
[52] U.S. Cl. ................... 358/458; 358/455; 358/456; 382/54
[58] Field of Search ......... 358/458, 455, 456, 457, 358/461, 464; 382/1, 18, 51, 54; 364/525, 526

[56] References Cited

U.S. PATENT DOCUMENTS 4,792,979 12/1988 Nomura et al. ............ 358/458
4,924,323 5/1990 Numakura et al. ......... 358/456
4,956,718 9/1990 Numakura et al. ......... 358/456

Primary Examiner—Joseph A. Orsino
Assistant Examiner—Thomas D. Lee
Attorney, Agent, or Firm—Ostrolenk, Faber, Gerb & Soffen

[57] ABSTRACT

Highlight density ($X_H$) (or shadow density) is established on the basis of a cumlative histogram ($H(X)$) of density of an original. Computed first are reference densities ($X_{HR}$, $X_{HL}$ and $X_{Hi}$-$X_{Hn}$) associated with prescribed reference statistic values ($Y_{HR}$, $Y_{HL}$ and $Y_{Hi}$-$Y_{Hn}$), respectively, and threshold values ($W_{Hi}$-$W_{Hn}$). Then, the reference density ($X_{HR}$) is compared with a prescribed threshold density ($X_{HS}$), and a difference ($X_{Hi}$) concerning the reference density ($X_{Hi}$) is compared with the threshold value ($W_{Hi}$) in a procedure, to thereby select one of procedures for establishing the highlight density.

11 Claims, 17 Drawing Sheets

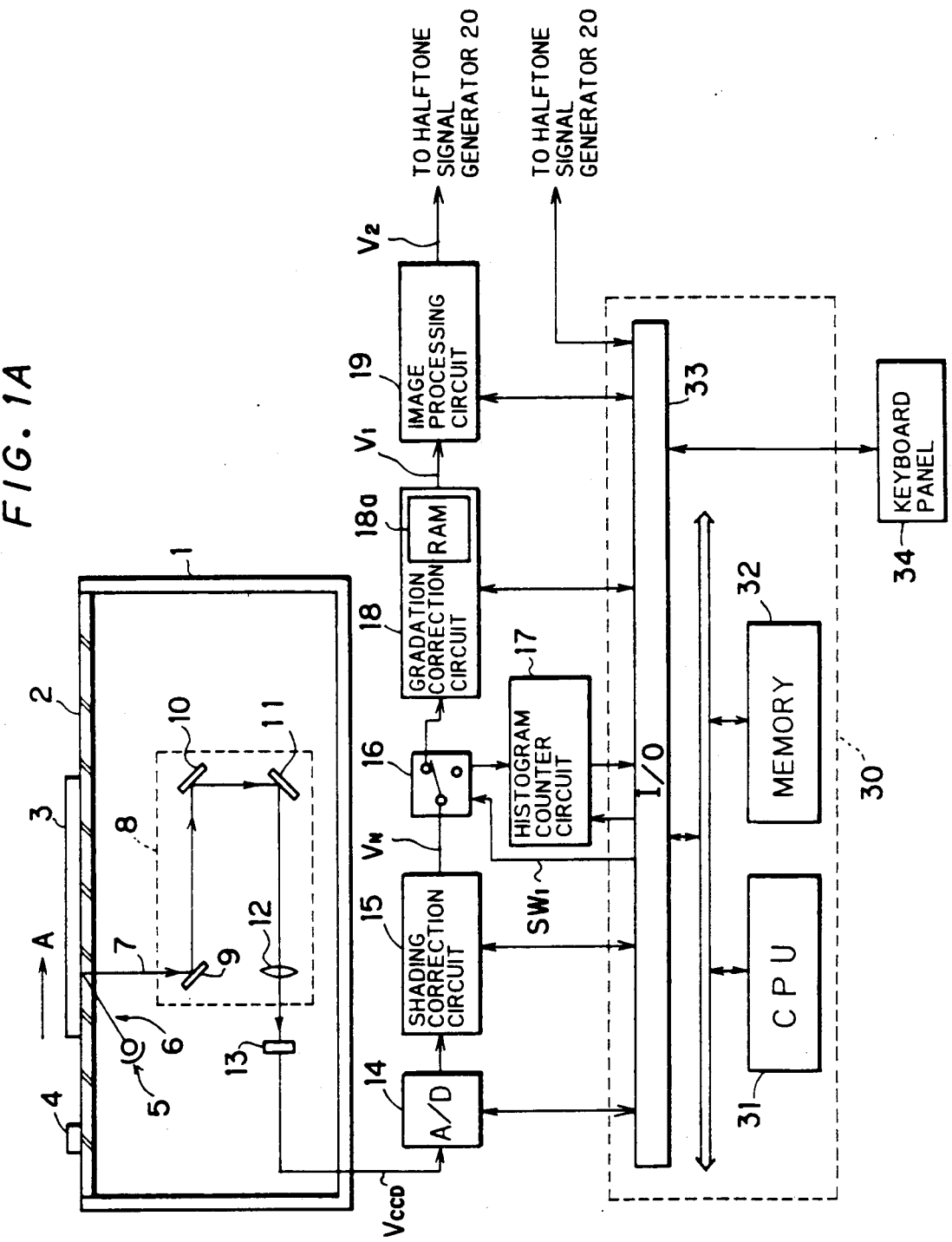

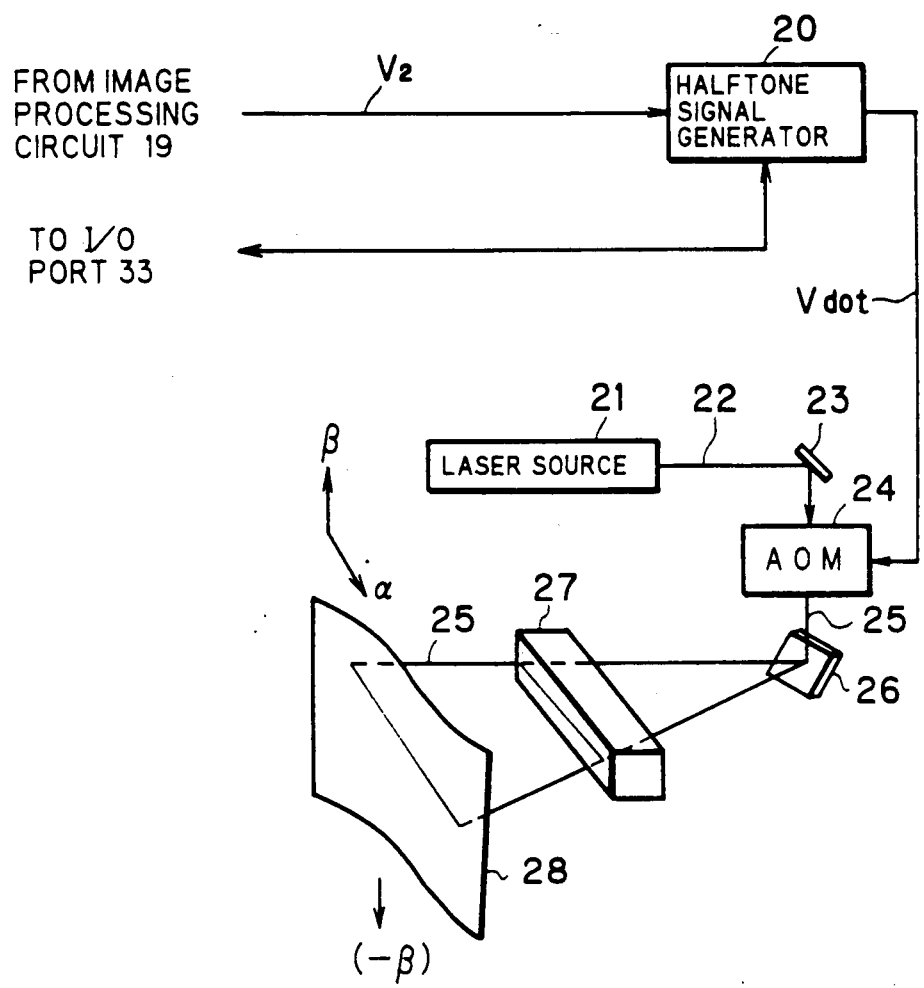

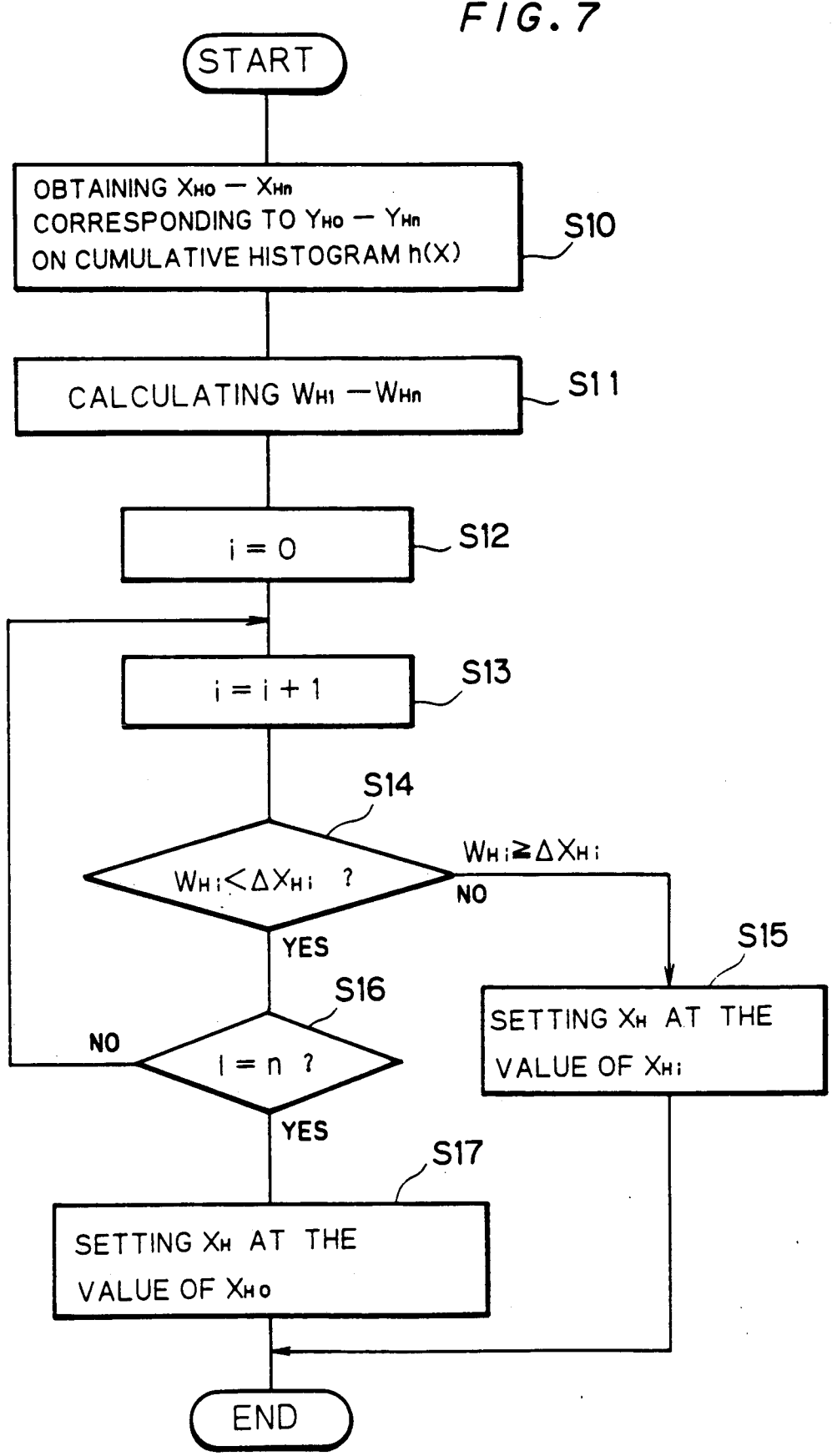

METHOD OF AND APPARATUS FOR ESTABLISHING HIGHLIGHT AND SHADOW DENSITIES

BACKGROUND OF THE INVENTION

1. Field of the Invention

The present invention relates to a method of and an apparatus for establishing highlight and shadow densities used for gradation control of image data obtained through reading an original.

2. Description of Background Art

In an image processing apparatus such as a process scanner or the like, an image data obtained through reading an original is subjected to gradation control, whereby a recorded image having a desired gradation expression is obtained. In the gradation control, a highlight density and a shadow density must to be previously set in the image processing apparatus in order to define both ends of that density range of the original which is faithfully reproduced with the recorded image. The highlight and shadow densities are respectively measured with a densitometer at a highlight area and a shadow area which are selected by an operator as the brightest area and the darkest area in the original. The measured highlight and shadow densities are set in the image processing apparatus to be used for the gradation control.

Because the highlight and shadow densities have been manually measured and set in the image processing apparatus by an operator, its operation takes much time and skill. Furthermore, a densitometer is necessary for the measurement besides the image processing apparatus. If the highlight area and the shadow area are not large enough for an aperture of the densitometer to be set in those areas, which aperture is usually a circle of a few millimeters in diameter, the highlight and shadow densities cannot be set at appropriate values.

In order to overcome those problems, there have been proposed some techniques for establishing highlight and shadow densities properly and easily.

(a) Japanese Patent Laying Open Gazette 1984-15939

According to the technique disclosed in this gazette, a highlight point and a shadow point where the highlight and shadow densities are to be measured are first specified in an original by an operator, respectively. Then, brightnesses of the respective highlight and shadow points are automatically read with a photoelectric converter device in a graphic arts scanner, to thereby be converted to the highlight and shadow densities in the process scanner. In order to prevent measurement error in the highlight and shadow densities because of dust or the like on the original, the brightnesses of the highlight and shadow points are determined as average values of brightnesses in the vicinity of the highlight and shadow points, respectively. The highlight and shadow densities are automatically determined on the basis of the average values. As a result, measurement error due to dust or the like is reduced and the highlight and shadow densities are obtained with considerable accuracy.

Although appropriate highlight and shadow densities are established by this technique, manual operation is still necessary for specifying the highlight and shadow points.

(b) Japanese Patent Laying Open Gazette 1981-87044

(c) Japanese Patent Laying Open Gazette 1986-20042

The applicant of the present invention is also the applicant of these gazettes. According to the technique disclosed in these gazettes, sizes of candidate areas for the highlight and shadow points are measured first. If the candidate areas have enough size for measuring accurate densities, they are selected as the highlight and shadow points, respectively. Then, densities of the candidate areas are determined to be highlight and shadow densities, respectively.

However, an apparatus for measuring only the sizes of the candidate areas is necessary in the above techniques. Further, it is difficult to set highlight and shadow densities appropriately for an original lacking candidate areas of sufficient size for measuring accurate densities.

As described above, techniques in the art are insufficient for establishing proper highlight and shadow densities easily.

There is another issue concerning highlight and shadow densities for an original where average density is shifted from a normal value. Highlight and shadow densities for such an abnormal original need to be set shifted from a normal value according to magnitude of the shift of the average density in order to reproduce a relatively normal image. If an area of low density does not exist in an original or if the area has only an extremely small size, highlight density should be set at a lower value than usual in order for a recorded image to be reproduced normally. On the other hand, if an area of high density does not exist or if the area has only an extremely small size, shadow density should be set at a higher value than usual in order for a recorded image to be reproduced normally.

When an original image is abnormal where average density is shifted from a normal value, operation for establishing proper highlight and shadow densities depends on a skilled operator. Therefore, a method of and an apparatus for easily establishing proper highlight and shadow densities for an abnormal image has been an issue for years.

SUMMARY OF THE INVENTION

The present invention is directed to a method of and an apparatus for establishing a gradation control density $X_c$ employed as a highlight density or a shadow density on a gradation correction curve $F(X)$ used in gradation correction of image data expressing density of each pixel in an image. The method comprises the steps of: (1) on the basis of the image data, generating a statistical curve $Y=S(X)$ expressing a cumulative density distribution on the image, where the statistical curve $Y=S(X)$ is defined on a X-Y coordinate plane having an X-axis representing density levels and a Y-axis representing a cumulative number of pixels in an arbitrary scale; (2) providing a threshold density $X_{TH}$ on the X-axis; (3) finding a terminal value $Y_m$ on the Y-axis at which the statistical curve $Y=S(X)$ is terminated; (4) providing a first reference value $Y_{1R}$ on the Y-axis, (5) finding a terminal density $X_m$ on the X-axis at which the statistical curve $Y=S(X)$ reaches the terminal value $Y_m$; (6) converting the first reference value $Y_{1R}$ through the statistical curve $Y=S(X)$, to thereby obtain a first reference density $X_{1R}$; (7) comparing the first reference density $X_{1R}$ with the threshold density $X_{TH}$, to thereby designate the statistical curve $Y=S(X)$ as a first type corresponding to an extraordinarily-bright image or an extraordinarily-dark image when the first reference density $X_{1R}$ is farther from the terminal density $X_m$ than the threshold density $X_{TH}$ is, or as a second type corresponding to an ordinary image other than said extraordinarily-bright image and said extraordinarily-dark image when the first reference density $X_{1R}$ is closer to the terminal density $X_m$ than the threshold density $X_{TH}$ is; (8) selecting a first procedure for setting the gradation control density $X_c$ at a terminal reference density $X_{TR}$ predetermined between the terminal density $X_m$ and the first reference density $X_{1R}$ when the statistical curve $Y=S(X)$ is the first type; or selecting a second procedure other than the first procedure for setting the gradation control density $X_c$ when the statistical curve $Y=S(X)$ is the second type; and (9) establishing the gradation control density $X_c$ through the first procedure or the second procedure selected at the step (8).

According to an aspect of the present invention, the terminal reference density $X_{TR}$ is computed by converting a terminal reference value $Y_{TR}$ through the statistical curve $Y=S(X)$, where the terminal reference value $Y_{TR}$ is preset between the terminal value $Y_m$ and the first reference value $Y_{1R}$.

According to another aspect of the present invention, a second procedure comprises the steps of: (a) presetting a first difference D between the gradation control density $X_c$ and a terminal density $X_a$ of the gradation correction curve $F(X)$; (b) substantially finding a line approximate to an end portion of the statistical curve $Y=S(X)$; (c) computing a terminal density $X_{im}$ of the line at which the line reaches the terminal value $Y_m$; and (d) establishing the gradation control density $X_c$ so that the first difference D agrees within a prescribed error with a second difference $D_i$ between the gradation control density $X_c$ and the terminal density $X_{im}$ of the line.

Preferably, the line is a straight line drawn through a first point $P_0$ and a second point $P_i$, where the first point $P_0$ is specified by a combination of a prescribed second reference value $Y_{2R}$ on the Y-axis and a second reference density $X_{2R}$ computed by converting the second reference value $Y_{2R}$ through the statistical curve $Y=S(X)$ and the second point $P_i$ is specified by a combination of a prescribed third reference value $Y_i$ on the Y-axis and a third reference density $X_i$ computed by converting the third reference value $Y_i$ through the statistical curve $Y=S(X)$, while the third reference value $Y_i$ is preset farther from the terminal value $Y_m$ than the second reference value $Y_{2R}$ is.

Further, the third reference value $Y_i$ and the third reference density $X_i$ may include a plurality of candidate values $Y_1$-$Y_n$ and a plurality of candidate densities $X_1$-$X_n$, respectively. The plurality of candidate values $Y_1$-$Y_n$ may be sequentially selected one by one in descending order of differences between the candidate values $Y_1$-$Y_n$ and the terminal value $Y_m$ to specify the second point $P_i$. A candidate density which is obtained by converting a selected candidate value through the statistical curve $Y=S(X)$ may be designated as the gradation control density $X_c$ under the condition that the first difference D agrees within the prescribed error with the second difference $D_i$ between the candidate density and the terminal density $X_{im}$ of the line.

The present invention is further directed to a method of and an apparatus for establishing a gradation control density $X_c$ employed as a highlight density or a shadow density on a gradation correction curve $F(X)$ used in gradation correction of image data expressing density of each pixel in an image. The method comprises the steps of: (a) on the basis of the image data, generating a statistical curve $Y=S(X)$ expressing cumulative density distribution on the image, where the statistical curve $Y=S(X)$ is defined on a X-Y coordinate plane having an X-axis representing density levels and a Y-axis representing a cumulative number of pixels in an arbitrary scale; (b) substantially finding a line approximate to an end portion of the statistical curve $Y=S(X)$; (c) presetting a first difference D between the gradation control density $X_c$ and a terminal density $X_a$ of the gradation correction curve $F(X)$; (d) finding a terminal value $Y_m$ on the Y-axis at which the statistical curve $Y=S(X)$ is terminated; (d) computing a terminal density $X_{im}$ of the line at which the line reaches the terminal value $Y_m$; and (f) establishing the gradation control density $X_c$ so that the first difference D agrees within a prescribed error with a second difference $D_i$ between the gradation control density $X_c$ and the terminal density $X_{im}$ of the line.

Preferably, the line is a straight line drawn through a first point $P_0$ and a second point $P_i$, where (l) the first point $P_0$ is specified by a combination of a prescribed first reference value $Y_{2R}$ on the Y-axis and a first reference density $X_{2R}$ computed by converting the first reference value $Y_{2R}$ through the statistical curve $Y=S(X)$ and the second point $P_i$ is specified by a combination of a prescribed second reference value $Y_i$ on the Y-axis and a second reference density $X_i$ computed by converting the second reference value $Y_i$ through the statistical curve $Y=S(X)$, while the second reference value $Y_i$ is preset farther from the terminal value $Y_m$ than the first reference value $Y_{2R}$ is.

Further, the second reference value $Y_i$ and the second reference density $X_i$ may include a plurality of candidate values $Y_1$-$Y_n$ and a plurality of candidate densities $X_1$-$X_n$ respectively. The plurality of candidate values $Y_1$-$Y_n$ may be sequentially selected one by one in descending order of differences between the candidate values $Y_1$-$Y_n$ and the terminal value $Y_m$ to specify the second point $P_i$. A candidate density which is obtained by converting a selected candidate value through the statistical curve $Y=S(X)$ may be designated as the gradation control density $X_c$ under the condition that the first difference D agrees within the prescribed error with the second difference $D_i$ between the candidate density and the terminal density $X_{im}$ of the line.

Accordingly, an object of the present invention is to provide a method of and an apparatus for easily establishing proper highlight and shadow densities according to density characteristics of an original.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are block diagrams showing the structure of a graphic arts scanner applied to preferred embodiments of the present invention, FIG. 7 is a flow chart showing a procedure according to a second embodiment of the present invention.

RELATIONSHIP BETWEEN SYMBOLS

Figure 2A:
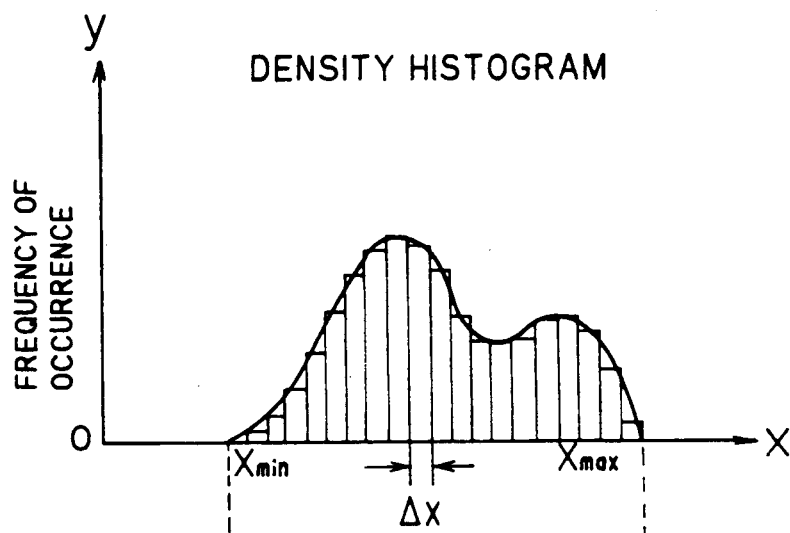
FIGS. 2A and 2B are graphs respectively showing a density histogram and a cumulative histogram.

In the following description of preferred embodiments, various symbols expressing mathematical or physical quantities are used in order to clarify quantitive character of the preferred embodiment. However, the symbols in the preferred embodiment are different from those used in the section of "SUMMARY OF INVENTION" and in the appended claims. This is because the symbols in the preferred embodiments are so provided as to express the quantities under embodied conditions, while those in the SUMMARY OF THE INVENTION and the claims are provided for representing global concept generically. For reference, the relationship or correspondence between these symbols are listed in Table 1.

TABLE 1

| Claims | Preferred Embodiments | Claims | Preferred Embodiments |
|---|---|---|---|
| D | $D_H, D_S$ | — | — |
| $D_i$ | $D_i$ | — | — |
| F (X) | F (X) | — | — |
| $P_0$ | $P_0$ | — | — |
| $P_i$ | $P_1$-$P_4$ | — | — |
| $X_a$ | $X_a, X_b$ | — | — |
| $X_c$ | $X_H, X_S$ | — | — |
| $X_i, X_1$-$X_n$ | $X_{H1}$-$X_{H3}$, $X_{S1}$-$X_{S3}$ | $Y_i, Y_1$-$Y_n$ | $Y_{H1}$-$Y_{H3}$, $Y_{S1}$-$Y_{S3}$ |
| $X_{im}$ | $X_{im}$ | — | — |
| $X_m$ | $X_{min}, X_{max}$ | $Y_m$ | $Y_{min}, Y_{max}$ |
| $X_{TH}$ | $X_{HS}, X_{SS}$ | — | — |
| $X_{TR}$ | $X_{HL}, X_{SL}$ | $Y_{TR}$ | $Y_{HL}, Y_{SL}$ |
| $X_{1R}$ | $X_{HR}, H_{SR}$ | $Y_{1R}$ | $Y_{HR}, Y_{SR}$ |
| $X_{2R}$ | $X_{HO}, X_{SO}$ | $Y_{2R}$ | $Y_{HO}, Y_{SO}$ |
| Y = S (X) | Y = h (X), Y = H (X) | — | — |

DESCRIPTION OF THE PREFERRED EMBODIMENTS

FIGS. 1A and 1B are schematic block diagrams showing a graphic arts scanner in which an apparatus according to a preferred embodiment of the present invention is assembled. The graphic arts scanner shown in FIGS. 1A, 1B comprises a transparent original-receiving glass plate 2 provided in an upper opening of a frame box 1, so that an original 3 is placed on the glass plate 2, being downwardly directed. The original-receiving glass plate 2 is provided in its upper end surface with a white reference plate 4 having reference optical density. The white reference plate 4 is employed for shading correction.

Illumination light 6 from a light source 5, which is formed by a halogen lamp or the like, is reflected by the surface of the original 3 to be a reflected light 7 having image information. The reflected light 7 enters a first mirror 9 included in an optical system 8 to be reflected. The light 7 reflected by the first mirror 9 is successively reflected by second and third mirrors 10 and 11, to form an image on a light receiving surface of a charge-coupled device (CCD) line image sensor 13 serving as a photoelectric converter through an image forming lens 12. The CCD line image sensor 13 comprises a plurality of CCD elements one-dimensionally arrayed in a direction perpendicular to the plane of the drawing. The direction perpendicular to the plane of the drawing corresponds to a main scanning direction.

The incident light focused on the light receiving surface of the CCD line image sensor 13 is photoelectrically converted into an image signal $V_{CCD}$ for each pixel by the CCD line image sensor 13. The image signal $V_{CCD}$ is digitized by an A-D converter 14, to be supplied to a shading correction circuit 15 for each pixel. The shading correction circuit 15 is adapted to correct nonuniformity in illuminaiton on the surface of the original 3, nonuniformity in image-forming function of the image-forming optical system 8 and nonuniformity in sensitivity of the respective CCD elements forming the CCD line sensor 13. The shading correction circuit 15 generates an image signal $V_N$ after the shading correction.

The image signal $V_N$ is selectively supplied to a histogram counter circuit 17 or a gradation correction circuit 18 having a look-up table RAM 18a through a switching circuit 16.

The histogram counter circuit 17 is employed to obtain a cumulative histogram as statistics expressing density characteristics of the original 3. As is described later in detail, highlight and shadow densities are determined on the basis of the result obtained in the histogram counter circuit 17, and a gradation correction table is generated using the highlight and shadow densities. The gradation correction table is stored in the RAM 18a.

An image signal $V_1$ generated in the gradation correction circuit 18 is supplied to an image processing circuit 19, to be subjected to processing such as contour enhancement, that is, sharpness enhancement, and magnification change. An image signal $V_2$ outputted from the image processing circuit 19 is supplied to a halftone signal generator 20. A halftone dot signal $V_{dot}$ generated in the halftone signal generator 20 serves as a modulation control signal for an acoustic optical modulator 24.

The acoustic optical modulator 24 receives laser beam 22 from a laser source 21 through a mirror 23. The acoustic optical modulator 24 modulates the laser beam 22 on the basis of the halftone dot signal $V_{dot}$, to provide an exposure beam 25. The exposure beam 25 is horizontally oscillated by vibration of a galvano mirror 26, to be emitted on a recording photosensitive material 28 through an image-forming optical system 27 formed by an fθ lens and the like. The vibration of the galvano mirror 26 is synchronous with output timing of the CCD elements in the CCD line sensor 13, whereby optical scanning in the main scanning direction α is achieved.

The light source 5 and the first mirror 9 are fixed to a mechanism (not shown) moving relative to the original 3 in a direction A, whereby the original 3 is scanned in the direction A. In synchronization with this, the photosensitive material 28 is moved in the downward direction ($-\beta$), to thereby achieve reading subscanning in the direction A and recording subscanning in a direction $\beta$ synchronously.

This apparatus is also provided with a microcomputer 30 for controlling the respective circuits and processing the respective data, especially processing for establishing highlight and shadow densities, and processing for generating the gradation correction table as described later. The microcomputer 30 has a CPU 31 and a memory 32, and is connected to the A-D converter 14, the shading correction circuit 15, the switching circuit 16, the histogram counter circuit 17, the gradation correction circuit 18, the image processing circuit 19 and the halftone signal generator 20 through an I/O port 33. A keyboard panel 34 for inputting various data as hereinafter described is also connected to the I/O port 33.

In a first stage for establishing highlight and shadow densities according to preferred embodiments of the present invention, a cumulative histogram about an object area in the original 3 is obtained through prescanning the original 3 as described below. The object area is a part of the original 3 as an object in reading and reproducing.

First, the switching circuit 16 is switched to the histogram counter circuit 17 according to a switching signal $SW_1$ supplied from the microcomputer 30. Then, the object area in the original 3 is scanned and image signal $V_{CCD}$ is sequentially generated in the CCD line sensor 13 accordingly. The image data $V_{CCD}$ is A-D converted in the A-D converter 14 and then supplied to the shading correction circuit 15 to be subjected to shading correction. The shading correction is performed on the basis of reference data obtained by reading the white reference plate 4. The image signal $V_N$, which is obtained as a result of the shading correction, is supplied to the histogram counter circuit 17 through the switching circuit 16.

When the prescanning of the original 3 is completed, the histogram counter circuit 17 holds a density histogram shown in FIG. 2A for example. The abscissa axis of the graph is density X. The ordinate axis of the graph is frequency of occurence y of pixels having the density X. The frequency of occurence y is obtained by dividing sum of pixels having the density X by the total number of pixels. A density interval $\Delta X$ of the graph is a unit of density width used for constructing the density histogram. The histogram counter circuit 17 further generates a cumulative histogram $h(X)$ shown in FIG. 2B. The ordinate axis of the graph is cumulative frequency of occurence Y concerning the density X. In the FIGS. 2A and 2B and the other figures hereinafter described, symbols $X_{min}$ and $X_{max}$ are defined as follows:

$X_{min}$: Density at which the cumulative density histogram $h(X)$ steps up from zero percent. $X_{min}$ is hereinafter referred to as "minimum density".

$X_{max}$: Density at which the cumulative density histogram $h(X)$ reaches a hundred percent. $X_{max}$ is hereinafter referred to as "maximum density".

Figure 2B:
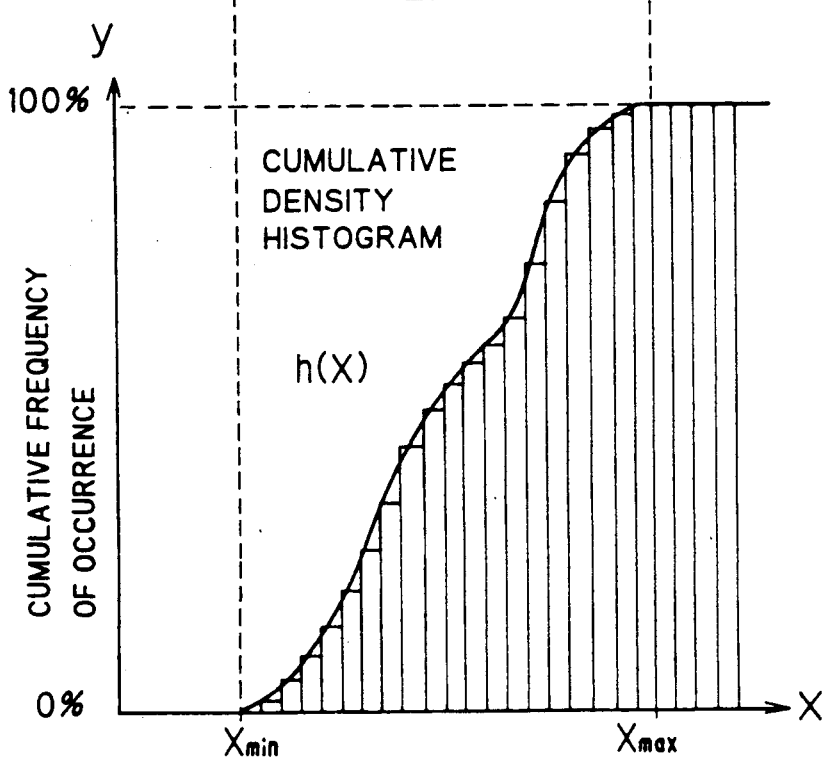
Figure 3A:
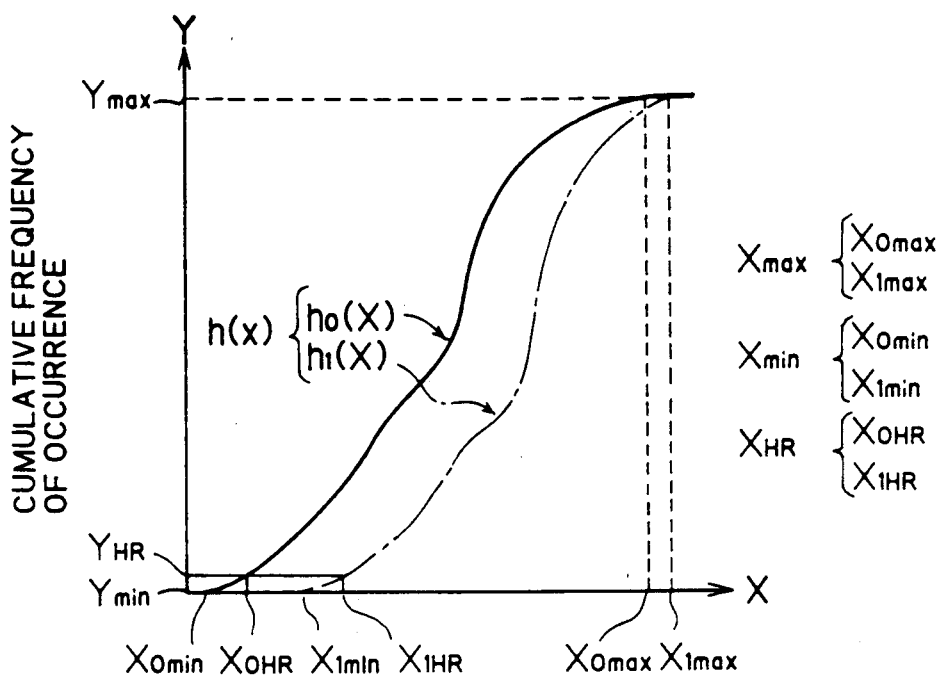
FIGS. 3A and 3B are graphs showing cumulative histograms in a first embodiment of the present invention.
Figure 3B:
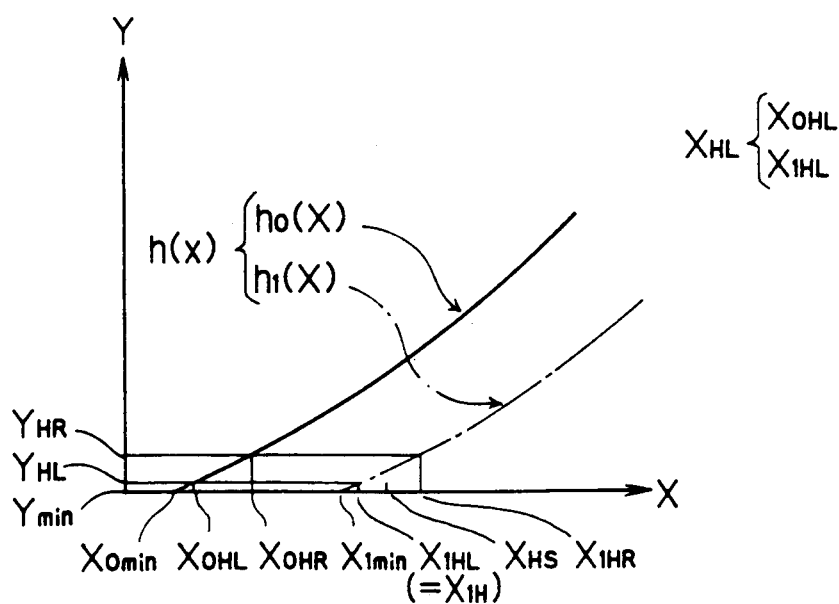

FIG. 3A is a graph showing an example of the cumulative histogram to be processed in a first embodiment of the present invention. FIG. 3B is an enlarged view showing a part of FIG. 3A near the origin. A cumulative histogram $h_0(X)$ is associated with an ordinary original which is appropriately exposed. A cumulative histogram $h_1(X)$ is associated with an extraordinarily-dark (or "low-key") original such as a discolored original and an original underexposed in taking picture of a subject. The cumulative histograms $h_0(X)$ and $h_1(X)$ are simplified graphs showing examples of the histogram $h(X)$ of FIG. 2B. A minimum value $Y_{min}$ and a maximum value $Y_{max}$ of cumulative frequency of occurence is zero and a hundred percent, respectively, for example.

There are some items considered in a first embodiment of the present invention. First, since the minimum density $X_{min}$ is generally easy to fluctuate according to dust, defects or the like on an original, it is not good to adapt the minimum density $X_{min}$ for the highlight density in consideration of reproducibility of the gradation correction processing. Accordingly, the highlight density is usually set at a value a little higher than the minimum density $X_{min}$.

Second, if density character of an original is abnormal, value of the highlight density is determined as follows: The cumulative histogram $h_1(X)$ of an extraordinarily-dark original is shifted to the right, that is, the higher density side from the histogram $h_0(X)$ of a normal original, and its minimum density $X_{1min}$ is much larger than a minimum density $X_{0min}$ of the normal original. For the extraordinarily-dark original, the highlight density is set at as small a value as the minimum density $X_{1min}$ in order for a brighter part to be emphasized in a reproduced image, whereby the reproduced image can be produced as comparatively beautiful. The treatment described above is achievable only when it is recognizable whether an original to be treated is normal or not. However, it can be judged whether density character of the original is normal or not on the basis of a density value associated with a prescribed cumulative frequency in its histogram.

Taking the above items into consideration, a reference density (RD) associated with a prescribed value of reference cumulative frequency (RCF) of occurrence is first obtained in a procedure of the first embodiment, and then the density character of the original is recognized through comparing the reference density with a prescribed threshold value. According to the density character, one of several procedures prepared in advance for establishing the highlight density is selected as an appropriate one to the original, and the highlight density is obtained through the selected procedure.

Figure 4:
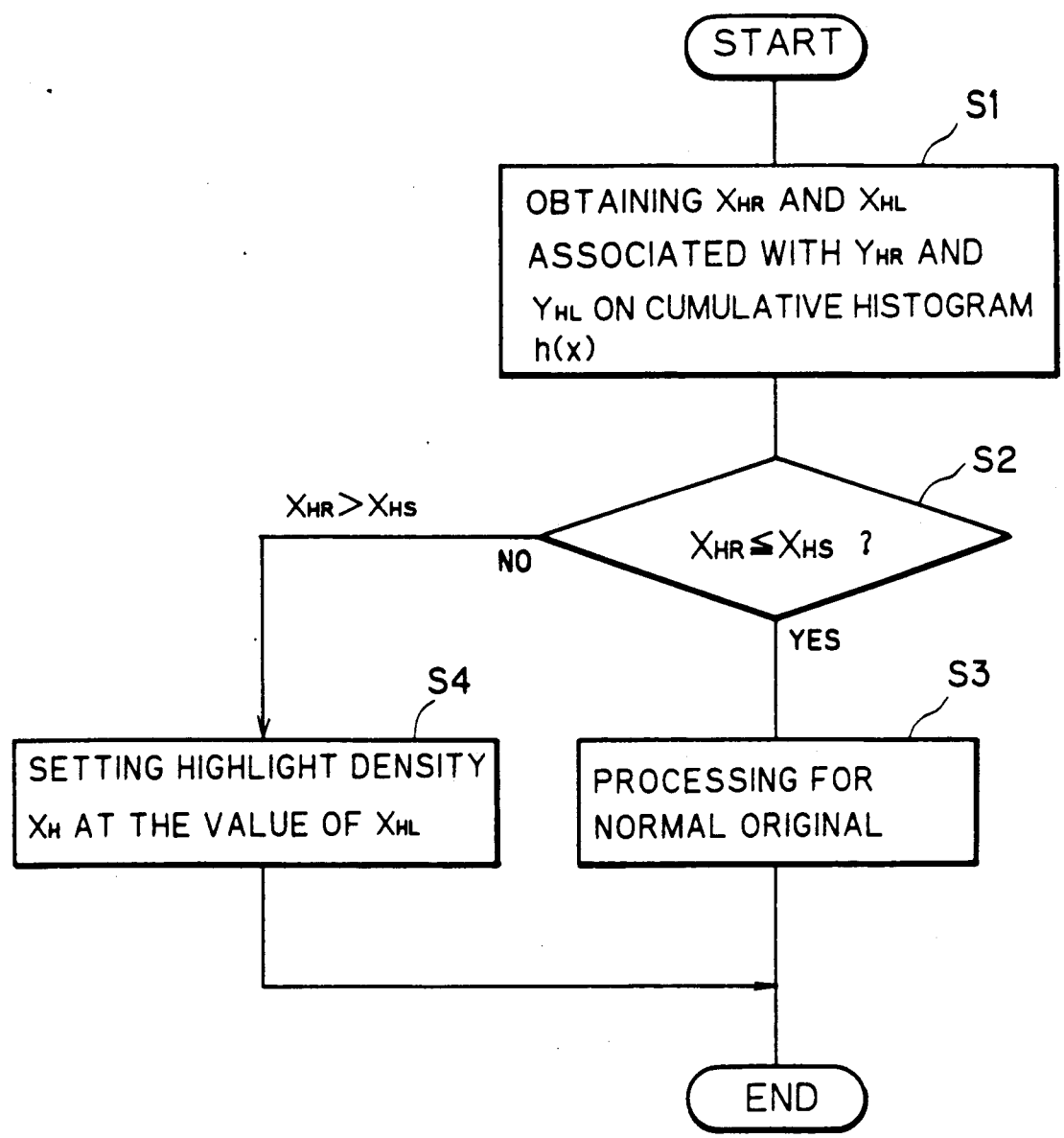
FIG. 4 is a flow chart showing a procedure according to the first embodiment.

FIG. 4 is a flow chart showing the procedure according to a method of the first embodiment.

At a step S1, a reference density $X_{HR}$ for highlight density ("highlight RD") and a minimum RD $X_{HL}$ associated with prescribed values of a reference cumulative frequency $Y_{HR}$ for highlight density ("highlight RCF") and a minimum RCF $Y_{HL}$, respectively, are obtained on a cumulative histogram $h(X)$. In FIGS. 3A and 3B, $X_{HR}=X_{0HR}$ and $X_{HL}=X_{0HL}$ in the histogram $h_0(X)$, and $X_{HR}=X_{1HR}$ and $X_{HL}=X_{1HL}$ in the histogram $h_1(X)$. The highlight RD $X_{HR}$ is used as an index showing how many pixels of comparatively low densities exist in the original. The minimum RD $X_{HL}$ is used as an index showing a density where the cumulative histogram $h(X)$ substantially steps up. Accordingly, the minimum RCF $Y_{HR}$ is set as low as practicable and the highlight RCF $Y_{HR}$ is set higher than that. Detailed procedure for obtaining the highlight RD $X_{HR}$ and the minimum RD $X_{HL}$ is described later.

At a step S2, the highlight RD $X_{HR}$ is compared with a prescribed threshold density $X_{HS}$ for highlight density, whereby it is judged whether the original is normal one or abnormal one to be subjected to exceptional processing. If the highlight RD $X_{HR}$ is lower than the threshold density $X_{HS}$, the original is processed as a normal one at a step S3. For example, the following relation holds for the the cumulative histogram $h_0(X)$:

$$X_{0HR} < X_{HS}$$

In this case, the original is processed as a normal one at the step S3. The processing for a normal original may be performed according to a second embodiment of the present invention described later or some other method.

On the other hand, the following relation holds for the cumulative histogram $h_1(X)$:

$$X_{HS} < X_{1HR}$$

Then, a step S4 is executed as exceptional processing for an abnormal original. At the step S4, a highlight density $X_{1H}$ ($X_H$) is set at the minimum RD $X_{1HL}$ obtained at the step S1. Because the highlight density $X_{1H}$ is set close to the minimum density $X_{1min}$, pixels in a density range down to the highlight density $X_{1H}$ are faithfully reproduced, that a, comparatively bright part of the original can be faithfully reproduced to have a given gradation with halftone dots. Accordingly, a reproduced image can be produced beautiful.

If a color film is used as an original, for example, the highlight RCF $Y_{HR}$ may be preferably set at 0.1%–2.0%, especially 0.2%–0.8%. The threshold density $X_{HS}$ may be preferably set at about 0.35. The minimum RCF $Y_{HL}$ may be preferably set at 0.01%–0.5%, especially 0.02%–0.1%. The values of $Y_{HR}$ and $Y_{HL}$ are empirically determined as cumulative frequencies close to a minimum value which can invariably specify one typical density of an original according to density character of the original without influence of dust, defects and the like on the original. Consequently, the values of $Y_{HR}$ and $Y_{HL}$ are not limited in the above-stated ranges. Further, the values of $Y_{HR}$ and $Y_{HL}$ can be equal to each other. The value of $X_{HS}$ is also determined empirically and not limited in the above-stated range.

A shadow density for an extraordinarily-dark original such as an underexposed original, which has a histogram like $h_1(X)$ shown in FIG. 3A, can be set according to a second embodiment or some other method for a normal original. It is because, as shown in FIG. 3A, a maximum density $X_{1max}$ of the extraordinarily-dark original is not so much different from a maximum density $X_{0max}$ of the normal original.

Incidentally, the highlight density $X_H$ may be computed by a prescribed function $f_H$ of the densities $X_{HR}$ and $X_{HL}$ as follows:

$$X_H = f_H(X_{HR}, X_{HL}) \qquad (1)$$

For example, the highlight density $X_H$ may be computed by the following linear equation with a weighting coefficient k:

$$X_H = kX_{HR} + (1-k)X_{HL} \qquad (2)$$

where
$0 < k < 1$.
According to the equation (2), the highlight density $X_H$ is determined at a value between the minimum RD $X_{HL}$ and the highlight RD $X_{HR}$.

As to an extraordinarily-bright (or "high-key") original such as an overexposed original and a faded original, a shadow density can be appropriately determined through similar processing to the above processing at a higher density range of its cumulative histogram.

A method according to a second embodiment of the present invention is explained along with FIG. 5 through 8.

Figure 5:
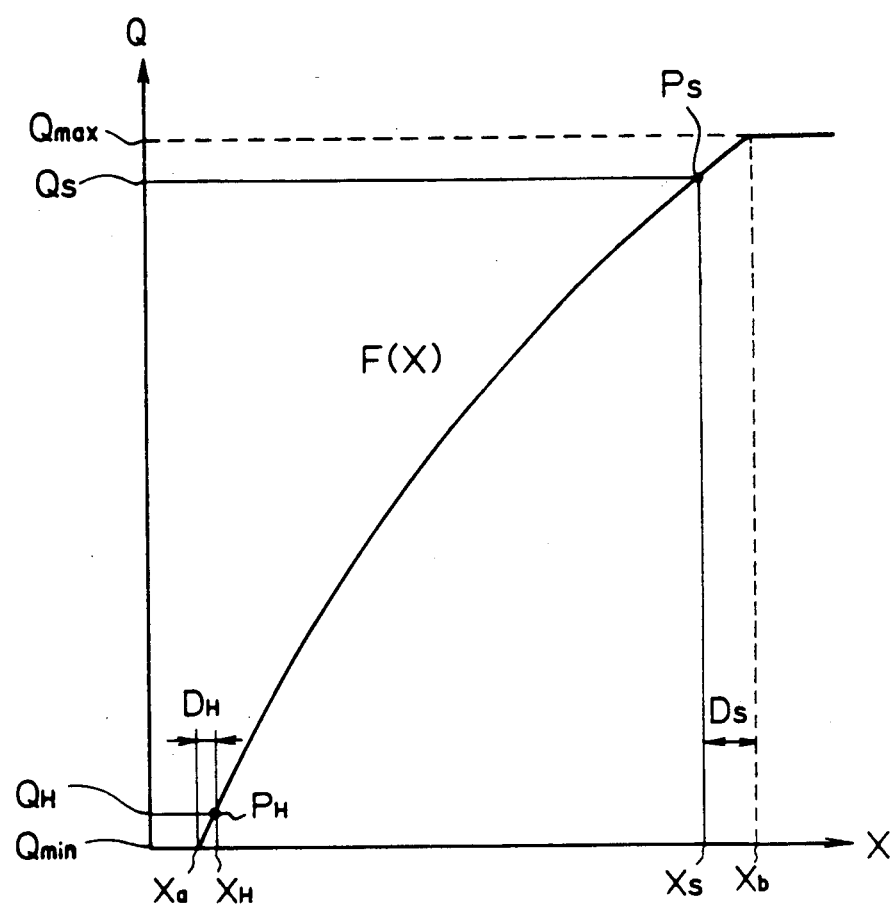
FIG. 5 is a graph showing a gradation correction curve.

FIG. 5 is a graph showing a gradation correction curve F(X) employed for gradation control. The abscissa axis of the graph is density X, and the ordinate axis is halftone area rate Q in a recorded image. The gradation correction curve F(X) is determined as a curve drawn through coordinate points $P_H$ and $P_S$ which are specified by the values of the highlight density $X_H$, the shadow density $X_S$, a halftone area rate $Q_H$ for the highlight density and a halftone area rate $Q_S$ for the shadow density. As is known in the art, the halftone area rates $Q_H$ and $Q_L$ are specified so that halftone dots having area rates between those values $Q_H$ and $Q_L$ can be invariably reproducible. The values of $Q_H$ and $Q_L$ are set at 5% and 95%, respectively, for example. Accordingly, by using the gradation correction curve F(X), image areas of an original having densities between the highlight density $X_H$ and the shadow density $X_S$ are invariably reproduced with halftone dots having area rates between $Q_H$ and $Q_S$.

Further, image areas in a density range between the highlight density $X_H$ and a density $X_a$ associated with a minimum halftone area rate $Q_{min}$ (0% for example) can be reproduced with halftone dots expressing some gradation, although reliability and reproducibility of the halftone dots may be worse. This is also true with image areas in a density range between the shadow density $X_S$ and a density $X_b$ associated with a maximum halftone area rate $Q_{max}$ (100% for example). Those density ranges have the width $D_H$ and $D_S$ as shown in FIG. 5, respectively.

It can be seen that if the minimum density $X_{min}$ of FIG. 2B is equal to the density $X_a$ of FIG. 5 and the maximum density $X_{max}$ of FIG. 2B is equal to the density $X_b$ of FIG. 5, the density range of an original is reproduced most widely and effectively. Hence, the main purpose of the second embodement is to equalize the minimum density $X_{min}$ and the density $X_a$, and the maximum density $X_{max}$ and the density $X_b$. However, the densities $X_a$ and $X_b$ are not directly set for the gradation correction curve F(X), but the highlight density $X_H$ and the shadow density $X_S$ are set for it. Accordingly, for the above purpose, the highlight and shadow densities $X_H$ and $X_S$ need to be set appropriately according to shapes of both ends of the cumulative histogram h(X) so that the densities $X_a$ and $X_b$ of the gradation correction curve F(X) becomes equal to the minimum density $X_{min}$ and the maxmum density $X_{max}$ of the cumulative histogram h(X), respectively.

According to a method of the second embodiment, one of processing several procedures prepared in advance is selected according to shape of end portion of the cumulative histogram h(X). Then the cumulative histogram h(X) is processed by the selected procedure so that appropriate highlight and shadow densities are determined.

Figure 6A:
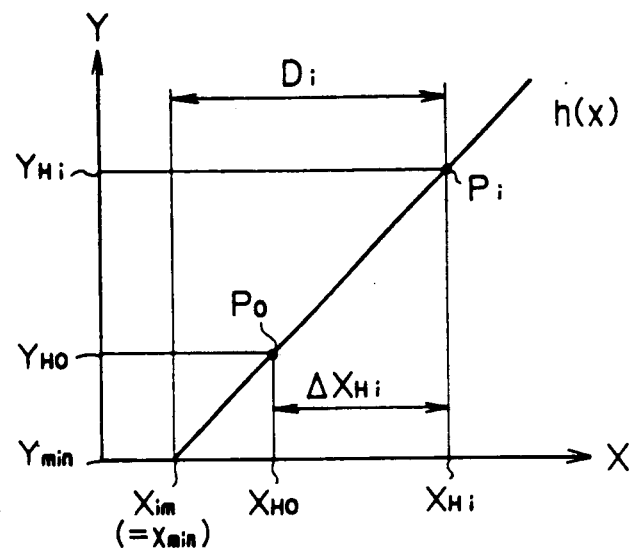
FIGS. 6A and 6B are enlarged views showing an end part of a cumulative histogram.

FIG. 6A is an enlarged view showing a highlight part of the cumulative histogram h(X), where the histogram h(X) is approximated as a straight line. Now, two reference points $P_O$ ($X_{HO}$, $Y_{HO}$) and $P_i$ ($X_{Hi}$, $Y_{Hi}$) are selected on the histogram h(X), where the density $X_{Hi}$ is higher than the density $X_{HO}$. A density $X_{im}$ is defined as a density at which a straight line through the reference points $P_O$ and $P_i$ meets with the X axis. The density $X_{im}$ is equal to the minimus density $X_{min}$ because the histogram h(X) is also a straight line in the graph. Now a difference $D_i$ between the densities $X_{Hi}$ and $X_{im}$ is defined as:

$$D_i = X_{Hi} - X_{im} \tag{3}$$

A difference $\Delta X_{Hi}$ between the densities $X_{Hi}$ and $X_{HO}$ is also defined as:

$$\Delta X_{Hi} = X_{Hi} - X_{HO} \tag{4}$$

When the difference $D_i$ is equal to the width $D_H$ of the gradation correction curve F(X) shown in FIG. 5, the above-stated purpose is achieved through setting the highlight density $X_H$ at the density $X_{Hi}$. In this case, the relation between $\Delta X_{Hi}$ and $D_H$ is derived as follows:

First, the following equation holds because the histogram h(X) is approximated as a straight line:

$$\frac{Y_{Hi} - Y_{min}}{Y_{HO} - Y_{min}} = \frac{D_i}{D_i - \Delta X_{Hi}} \tag{5}$$

In the case stated above, the following relation holds:

$$D_H = D_i \tag{6}$$

Solving for $\Delta X_{Hi}$ using the equations (5) and (6):

$$\Delta X_{Hi} = D_H \left(1 - \frac{Y_{HO} - Y_{min}}{Y_{Hi} - Y_{min}}\right) \tag{7}$$

Because $Y_{min}$ is equal to 0% in usual, the following equation holds in place of the equation (7):

$$\Delta X_{Hi} = D_H \left(1 - \frac{Y_{HO}}{Y_{Hi}}\right) \tag{8}$$

The above purpose is achieved through setting the highlight density $X_H$ at the density $X_{Hi}$ which meets the equations (4) and (7) or (8).

However, the equation (7) or (8) does not necessarily hold strictly. For example, the righthand side of the equation (7) may be defined as $W_{Hi}$:

$$W_{Hi} = D_H \left(1 - \frac{Y_{HO} - Y_{min}}{Y_{Hi} - Y_{min}}\right) \tag{9}$$

If the value $\Delta X_{Hi}$ obtained by the equation (4) agrees with the value $W_{Hi}$ obtained by the equation (9) within a prescribed error, the above purpose can be well achieved.

Figure 6B:
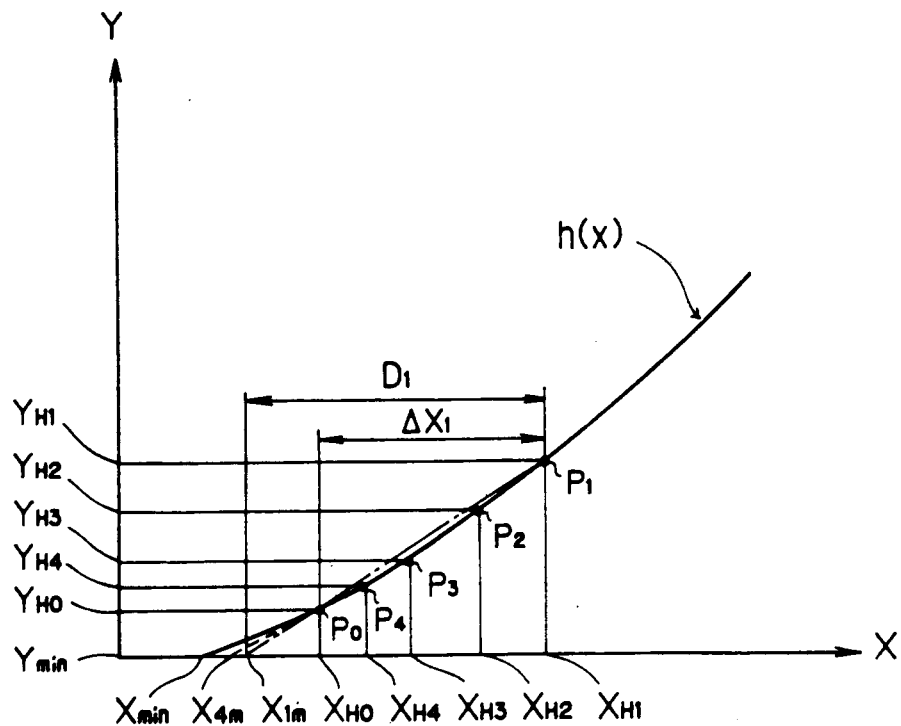
Figure 8A:
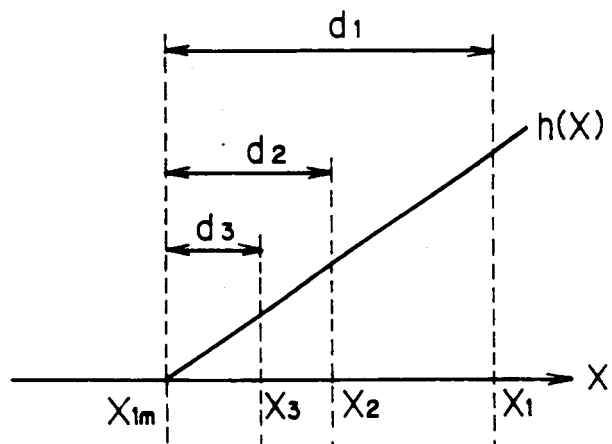
FIGS. 8A through 8D are schematic views showing the procedure for establishing a highlight density according to the second embodiment.
Figure 8B:
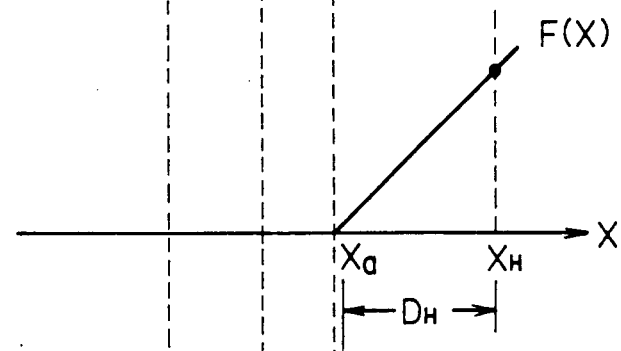
Figure 8C:
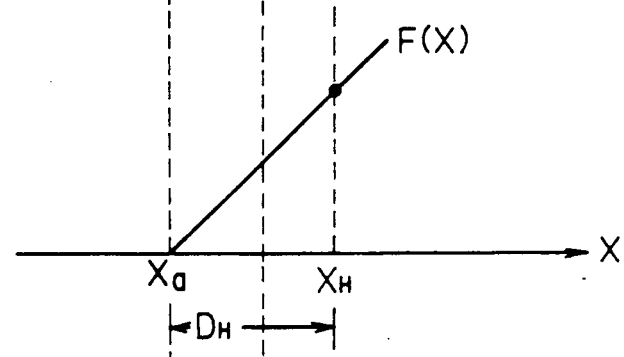
Figure 8D:
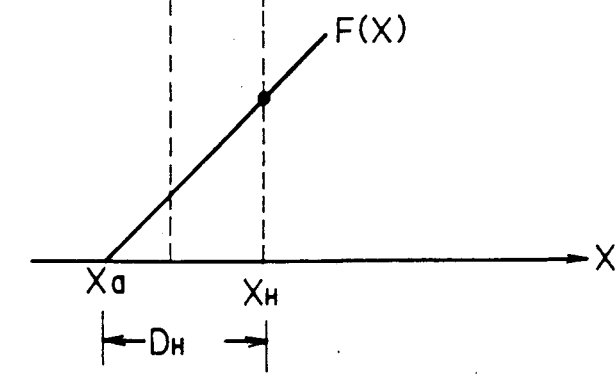

FIG. 7 is a flow chart showing the procedure according to the second embodiment. FIG. 6B is an enlarged view showing a highlight part (low density part) of the cumulative histogram h(X). The point of the processing described below is that, as shown in FIGS. 8A through 8D, a temporary value $X_1$, $X_2$ or $X_3$ of the highlight density $X_H$ is successively shifted to the lower density side of the cumulative histogram h(X) so that the highlight density $X_H$ is determined in order for the left side range having the width $D_H$ of the gradation correction curve F(X) to include the highlight part of the cumulative histogram h(X) at which the histogram h(X) starts to increase. When the density $X_2$ is selected as the highlight density $X_H$, as shown in FIG. 8C, a minimum density $X_{1m}$ of the histogram h(X) corresponds to the density $X_a$ of the gradation correction curve F(X) so that the gradation correction curve F(X) does not include a useless part at its highlight end. The density $X_2$ does not satisfy the above point as shown in FIG. 8B and the density $X_3$ includes a useless part between the densities $X_a$ and $X_{1m}$ as shown in FIG. 8C. Detailed procedure of the processing for establishing the highlight density $X_H$, as described above, is shown in FIG. 7.

At a step S10, reference densities (RD) $X_{H0}$–$X_{Hn}$ corresponding to reference cumulative frequencies (RCF) $Y_{H0}$–$Y_{Hn}$, respectively, are computed on the cumulative histogram h(X), where the RCF $Y_{H0}$–$Y_{Hn}$ have respective predetermined values at the lower density range and the subscript n is an integer. Then at a step S11, threshold values $W_{H1}$–$W_{Hn}$ are computed for respective RD's $X_{H1}$–$X_{Hn}$ by the equation (9). FIG. 6B shows the case in which n=4 and five RCF's $Y_{H0}$–$Y_{H4}$ are preset. Reference points $P_0$–$P_4$ on the histogram h(X) have respective coordinate values of $(X_{H0}, Y_{H0})$–$(X_{H4}, Y_{H4})$. The values $X_{H0}$ and $Y_{H0}$, which are the smallest of all, work as basic values in the procedure shown in FIG. 7. Therefore, the values $X_{H0}$ and $Y_{H0}$ are referred to as "basic reference density (basic RD)" and "basic reference cumulative frequency (basic RCF)", respectively. The following relation among the RCF's $Y_{H1}$–$Y_{H4}$ is determined for convenience with respect to the processing procedure described below:

$$Y_{H4} < Y_{H3} < Y_{H2} < Y_{H1} \tag{10}$$

In FIG. 6B, a density $X_{im}$, where the subscript i is an integer, is defined as a density at which a straight line through points $P_i$ and $P_0$ intersects the X axis. If the end portion of the histogram h(x) is nearly a straight line, a difference between the density $X_{im}$ and the minimum density $X_{min}$ is small.

At steps S12 and S13, the value of the subscript i is set at "1". Then a judgement whether the highlight density $X_H$ can be set at the value of the RD $X_{H1}$ or not is substantially performed at a step S14. In this step, a difference $\Delta X_{H1}$ between the densities $X_{H1}$ and $X_{H0}$ is compared with the threshold value $W_{H1}$ which is determined in advance in the step S11. If the difference $\Delta X_{H1}$ is smaller than or equal to the threshold value $W_{H1}$, the highlight density $X_H$ is set at the value of the density $X_{H1}$ at a step S15, and the processing is ended. This is because a difference $D_1$ between the density $X_{H1}$ and the minimum density $X_{1m}$ is smaller than or equal to the difference $D_H$, and because the initial purpose is achieved so that density range from the density $X_{im}$ to the density $X_{H1}$ is reproduced with certain gradation.

If the difference $\Delta X_{H1}$ is larger than the threshold value $W_{H1}$, the highlight density $X_H$ is not set at the density $X_{H1}$ and the processing returns from the step S16 to the step S13 where similar judgement on the next RD $X_{H2}$ is performed. Because the difference $\Delta X_{H1}$ is larger than the threshold value $W_{H1}$, the next RD $X_{H2}$ has to be smaller than the first RD $X_{H1}$. Consequently, the RCF $Y_{H1}$–$Y_{H4}$ are predetermined according to the equation (10). In other words, the highlight density $X_H$ needs to be set as high as possible or the cumulative histogram h(X) in order that the density range having the width $D_H$ shown in FIG. 5 is utilized as much as possible in gradation control. Accordingly, the judgement is sequentially executed on the densities $X_{H1}$ through $X_{H4}$ in order of decreasing value. Then, the highlight density $X_H$ is set at a density $X_{Hi}$ when its difference $\Delta X_{Hi}$ is smaller than or equal to its threshold value $W_{Hi}$.

If the subscript i is equal to a maximum number n (n=4 in FIG. 6B), the value of the basic RD $X_{H0}$ is selected as the highlight density $X_H$ at a step S17, and the processing is ended. Therefore, the basic RD $X_{H0}$ is a minimum value to be as the highlight density $X_H$. Accordingly, the smaller the RCF $Y_{H0}$ is predetermined, the wider becomes a density range in which the value of the highlight density is selected. The RCF $Y_{H0}$ is predetermined as a minimum cumulative frequency by which a proper density is invariably specified in the the highlight portion of the histogram h(X) according to density characteristics of an original without reference to dust, defects and the like on the original. Preferably, the value of the basic RCF $Y_{H0}$ may be set at 0.1%–0.5% and the RCF $Y_{H1}$-$Y_{Hn}$ are at 0.1%–2%.

The threshold value $W_{Hi}$ is not always calculated by the equation (9), but it may be given by the following equation having a semi-empirical value $\alpha_i$:

$$W_{Hi} = D_H \left( 1 - \frac{Y_{H0} - Y_{min}}{Y_{Hi} - Y_{min}} \right) + \alpha_i \tag{11}$$

The value $\alpha_i$ is given for each RD $X_i$, where the subscript i is an integer, and the value $\alpha_i$ is predetermined under consideration of the curvature at the end portion of the cumulative histogram h(X). In short, if the difference $\Delta X_{Hi}$ agrees with the threshold value $W_{Hi}$ given by the equation (9) within the prescribed error $\alpha_i$ or the former is smaller than the latter, the highlight density $X_H$ can be set at the value of the density $X_{Hi}$.

Although one of the RD's $X_{H0}$-$X_{Hn}$ is selected as the highlight density $X_H$ in the above-mentioned procedure, another value calculated on the basis of the RD's $X_{H0}$-$X_{Hn}$ may be selected instead. For example, a straight line may be drawn through two reference points $P_0$ ($X_{H0}$, $Y_{H0}$) and $P_1$ ($X_{H1}$, $Y_{H1}$) as shown in FIG. 6B to intersect the X axis at the density $X_{1m}$. Then the highlight density $X_H$ may be set at the value of a density which is higher than the density $X_{1m}$ by the difference $D_H$. Thus, a proper value for the highlight density $X_H$ can be easily set according to the purpose described above.

By a combination of the procedures of the first and second embodiments, appropriate highlight and shadow densities according to density characteristics of an original can be automatically established.

Figure 9:
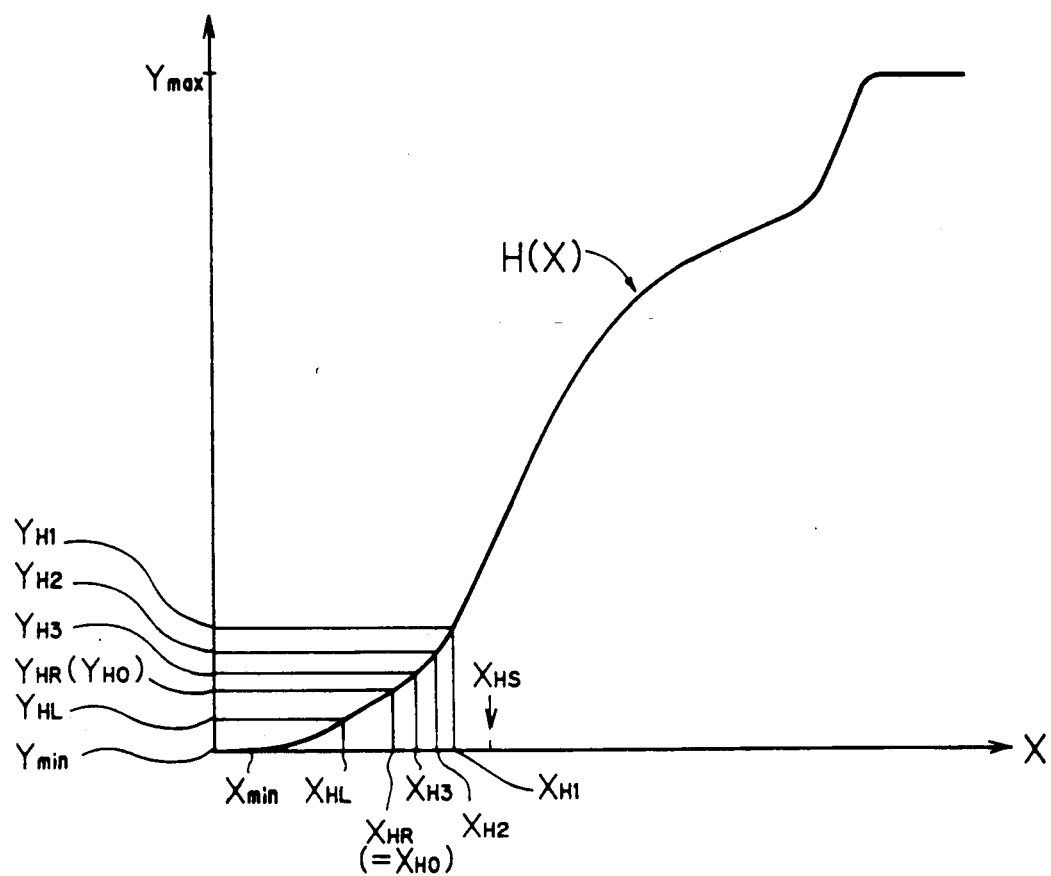
FIGS. 9 and 11 are graphs showing a cumulative histogram in the automatic setting of highlight and shadow densities.
Figure 10:
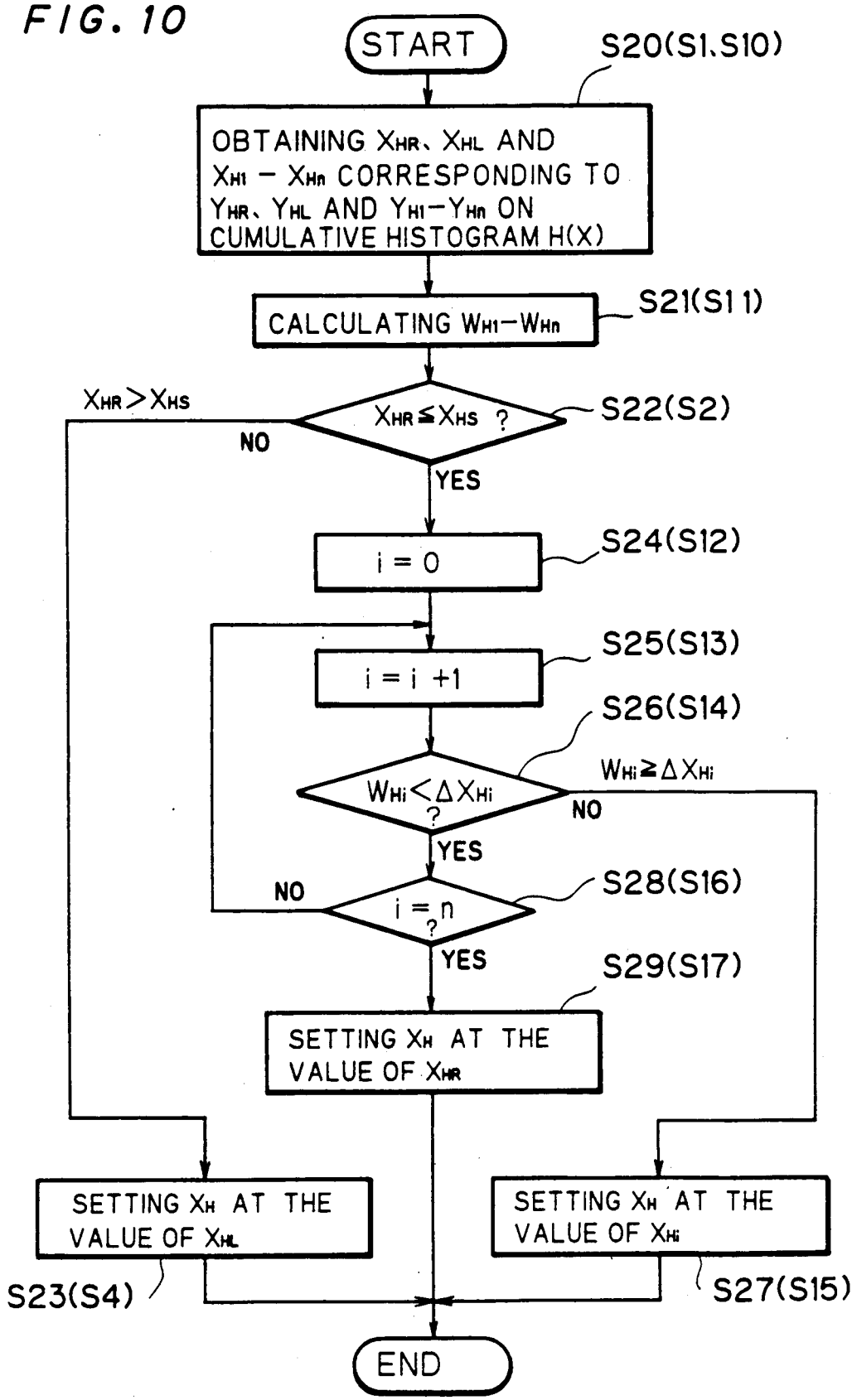
FIGS. 10 and 12 are flow charts showing procedures according to a third embodiment of the present invention.

FIG. 9 is a graph showing a cumulative histogram H(X) on which several values used in automatic setting of a highlight density are shown. FIG. 10 is a flow chart showing the procedure according to a third embodiment of the present invention.

At a step S20, a highlight RD $X_{HR}$, a minimum RD $X_{HL}$ and RD's $X_{H1}$-$X_{Hn}$ associated with a highlight RCF $Y_{HR}$, a minimum RCF $Y_{HL}$ and RCF's $Y_{H1}$-$Y_{Hn}$, respectively, are computed. This step includes the step S1 shown in FIG. 4 and the step S10 shown in FIG. 7. The highlight RCF $Y_{HR}$ of FIG. 9 works not only as the basic RCF $Y_{H0}$ in the second embodiment but also as the highlight RCF in the first embodiment. Therefore, the highlight RD $X_{HR}$ is the same with the basic RD $X_{H0}$ in FIG. 9.

Relations among the RCF's and among the RD's are as follows:

$$Y_{HL} < Y_{HR} = Y_{H0} < Y_{H3} < Y_{H2} < Y_{H1} \tag{12}$$

$$X_{HL} \leq X_{HR} = X_{H0} \leq X_{H3} \leq X_{H2} \leq X_{H1} \tag{13}$$

Then, threshold values $W_{H1}$-$W_{Hn}$ are calculated by the equation (9) at a step S21. At a step 22, the highlight RD $X_{HR}$ is compared with a predetermined threshold density $X_{HS}$. As described in the first embodiment, the highlight RCF $Y_{HR}$ is predetermined preferably at a range of 0.1%–2.0%, and the threshold density $X_{HS}$ is at about 0.35.

If the highlight RD $X_{HR}$ is judged to be higher than the threshold density $X_{HS}$, the original is subjected to a exceptional processing at a step S23. Namely, the minimum RD $X_{HL}$ is selected as the highlight density $X_H$ at the step S23 and the overall processing is ended. The step S23 corresponds to the step S4 in FIG. 4.

Since the highlight RD $X_{HR}$ is lower than the threshold density $X_{HS}$ in FIG. 9, the original is judged to have normal density characteristics at the highlight portion of the histogram H(X), and steps S24-S29 are executed. The steps S24-S29 as a whole corresponds to the step S3 of FIG. 4 as well as the steps S12-S17 of FIG. 7. A parameter i for subscript in FIG. 10 is initialized to be "1" at the steps S24 and S25. A density difference $\Delta X_{Hi}$ ($=X_{Hi}-X_{HR}$) is compared with a threshold value $W_{Hi}$ at the step S26 which is computed in advance at the step S21. If the difference $\Delta X_{Hi}$ is smaller than or equal to the threshold value $W_{Hi}$, the step S27 is executed such that the RD $X_{Hi}$ is selected as the highlight density $X_H$. On the other hand, if the difference $\Delta X_{Hi}$ is greater than the threshold value $W_{Hi}$, the next RD $X_{Hi+1}$ is subjected to processing on and after the step S25 again. If the RD $X_{Hi}$ is the last RD $X_{Hn}$ at the step S28, where n=3 in FIG. 9, the step S29 is executed that the highlight RD $X_{HR}$ is selected as the highlight density $X_H$. Preferably, the minimum RCF $Y_{HL}$ is predetermined at a range of 0.01%–0.5%, the RCF's $Y_{H1}$-$Y_{Hn}$ are at a range of 0.1%–2%, and the threshold density $X_{HS}$ is at about 0.35, respectively, as described before.

As has been described above, appropriate highlight density $X_H$ can be easily set in consideration of density characteristics of an original according to the third embodiment which includes methods of the first and second embodiments.

Figure 11:
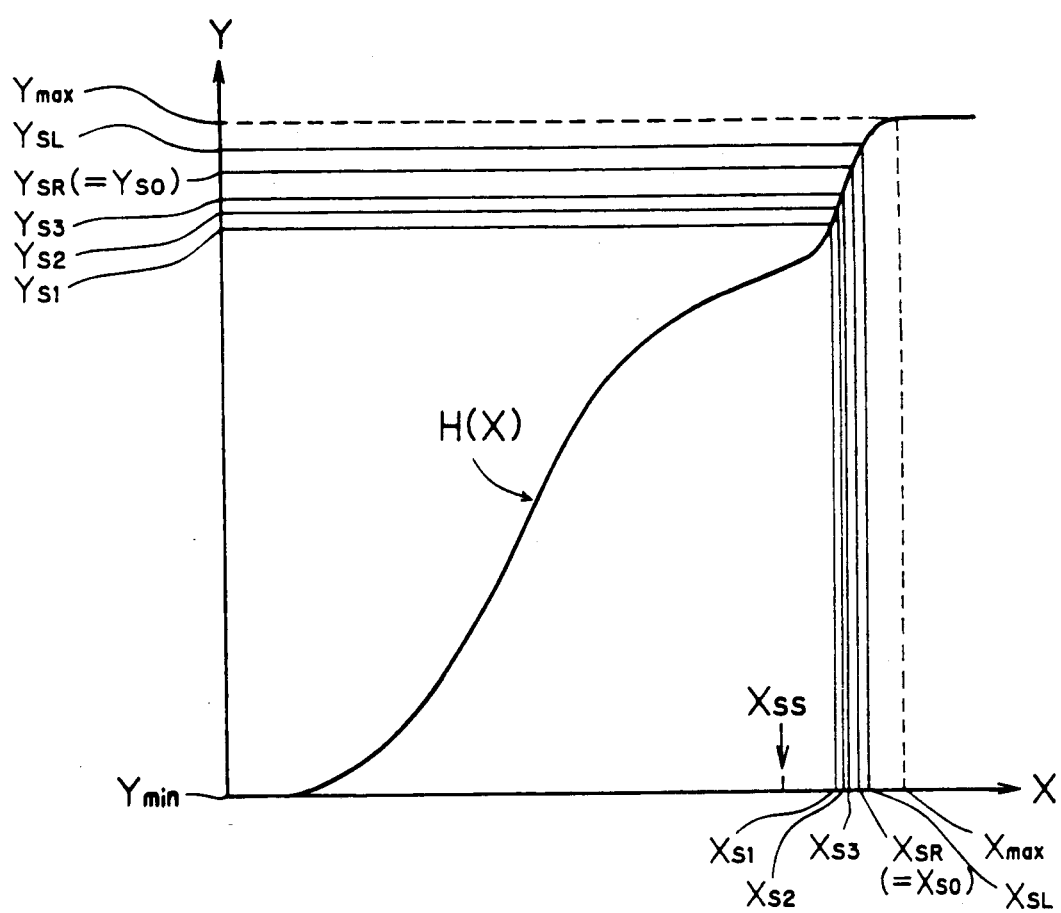
Figure 12:
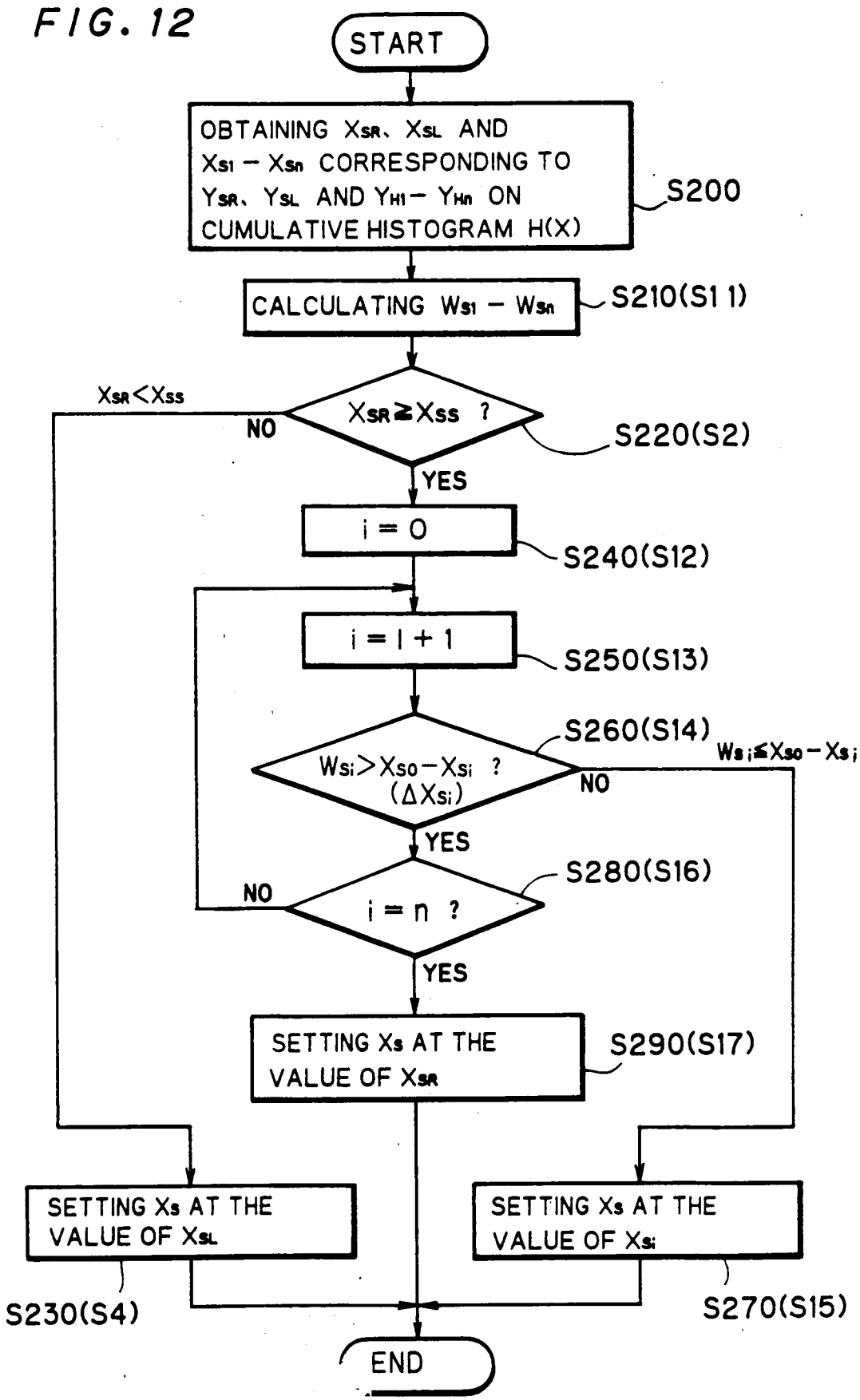

FIG. 11 is a graph showing the cumulative histogram H(X) with several values used in automatic setting of a shadow density. FIG. 11 corresponds to FIG. 9 for highlight density setting. FIG. 12 is a flow chart showing a procedure similar to that of FIG. 10, applied to shadow density setting. The steps S21-S29 of FIG. 10 correspond to steps S210-S290 of FIG. 12, respectively. The values shown in FIGS. 11 and 12 correspond to those shown in FIGS. 9 and 10, respectively, as follows:

| Reference Cumulative Frequency | $Y_{HR} \rightarrow Y_{SR}$ |
|---|---|
| Reference Density | $X_{HR} \rightarrow X_{SR}$ |
| Threshold Density | $X_{HS} \rightarrow X_{SS}$ |
| Reference Cumulative Frequency | $Y_{Hi} \rightarrow Y_{Si}$ (i = 1-3) |
| Reference Density | $X_{Hi} \rightarrow X_{Si}$ (i = 1-3) |
| Minimum Reference Cumulative Frequency $Y_{HL}$ $\rightarrow$ Maximum Reference Cumulative Frequency $Y_{SL}$ | |
| Minimum Reference Density $X_{HL}$ | |

-continued

| → Maximum Reference Density $X_{SL}$ | |
|---|---|
| Minimum Cumulative Frequency $Y_{min}$ | |
| → Maximum Cumulative Frequency $Y_{max}$ | |
| Density Width | $D_H \to D_S$ |
| Threshold Value | $W_{Hi} \to W_{Si}$ |

The relations (12) and (13) are replaced with the following relations (14) and (15):

$$Y_{SL} > Y_{SR} = Y_{SO} > Y_{S3} > Y_{S2} > Y_{S1} \quad (14)$$

$$X_{SL} \geq X_{SR} = X_{SO} \geq X_{S3} \geq X_{S2} \geq X_{S1} \quad (15)$$

Preferably, the shadow RCF $Y_{SR}$ is predetermined at a range of 99.5%–99.9%, the shadow RD $Y_{Si}$ is at a range of 98%–99.9%, the maximum RCF $Y_{SL}$ is at a range of 99.5%–99.9% and the threshold density $X_{SS}$ is at about 2.0, respectively.

The procedure for establishing shadow density shown in FIGS. 11 and 12 is almost the same with that for highlight density shown in FIG. 9 and 10, and therefor detailed explanation will be omitted.

Figure 13:
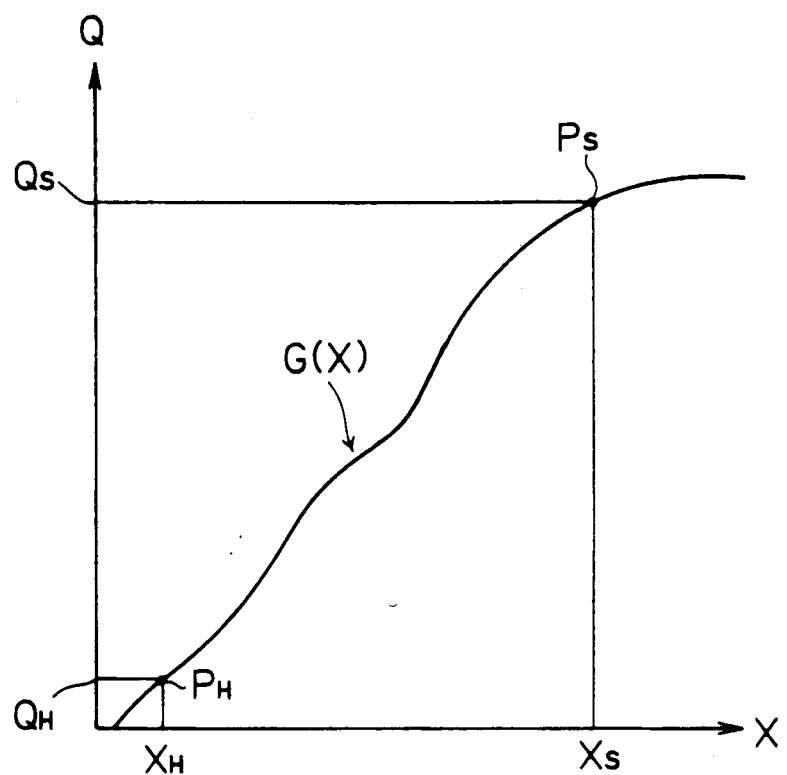
FIG. 13 is a graph showing a gradation correction curve.

A gradation correction table is generated on the basis of the highlight and shadow densities obtained according to the above procedures. For example, data expressing relation between density X and halftone area rate Q, which relation is shown as a gradation correction curve G(X) in FIG. 13, is stored in the RAM 18a of the gradation correction circuit 18 shown in FIG. 1 in form of a look-up table. The gradation correction curve G(X) is drawn through points $P_H$ and $P_S$ which are defined by a combination of the highlight density $X_H$ and a halftone area rate $Q_H$ therefor, and that of the shadow density $X_S$ and a halftone area rate $Q_S$ therefor, respectively. The halftone area rates $Q_H$ and $Q_S$ are predetermined in advance.

After a gradation correction table expressing the gradation correction curve G(X) is stored in the RAM 18a (FIG. 1A), the switching circuit 16 is switched to the gradation correction circuit 18. Then the original 3 is scanned and read again, whereby image data $V_N$ thus obtained is given to the gradation correction circuit 18. The image data $V_N$ is corrected in the circuit 18 according to the gradation correction curve G(X), to thereby be changed into a corrected image data $V_1$. A recorded image is finally produced as described before on the basis of the corrected image data $V_1$.

In the first embodiment, the reference density $X_{HR}$ is compared with a single value of the threshold density $X_{HS}$. However, the reference density $X_{HR}$ may be compared with plurality of threshold densities in order to select one of plurality of procedures preset associated with the plurality of threshold densities, respectively.

Although a shape of the cumulative histogram is approximated as a straight line at its end portion in the first embodiment and the value of the highlight density (or the shadow density) is determined on the basis of a difference between two of reference densities, the shape of the histogram may be approximated to a line expressed by a polynominal or the like. In such a case, the highlight density $X_H$ may be calculated by a function of the values of $X_{H0}$–$X_{Hn}$ and $Y_{H0}$–$Y_{Hn}$ as follows:

$$X_H = X_H(X_{H0}, \ldots, X_{Hn}, Y_{H0}, \ldots, Y_{Hn}) \quad (16)$$

The highlight density $X_H$ may be also set on the basis of a differential coefficient at the end portion of the histogram h(X).

Further, statistics r(X) expressed by the following equation may be utilized in place of the cumulative histogram h(X):

$$r(X) = \sqrt{h(X)} \Big/ \sum_{X=X_{min}}^{X_{max}} h(X) \quad (17)$$

Since a change rate of statistic value due to a density change on the statistics r(X) is less than on the histogram h(X), the highlight and shadow densities are established more steadily without reference to noise component on the original if the statistics r(X) are utilized instead of the histogram h(X).

In general, the highlight and shadow densities may be set according to a shape of an end portion of density statistics of an original.

Figure 14A:
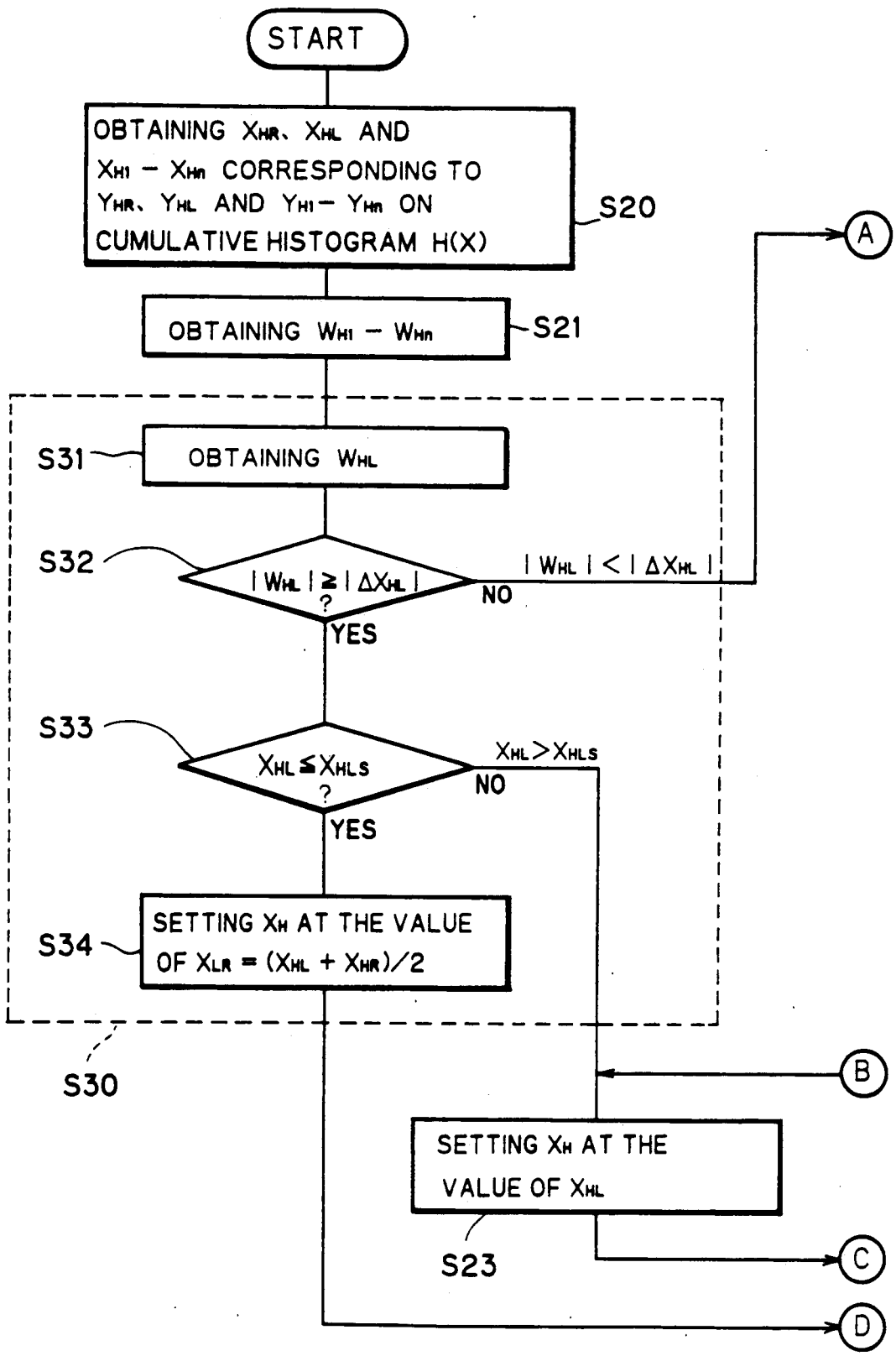
FIGS. 14A and 14B are flow charts showing another procedure according to the third embodiment.
Figure 14B:
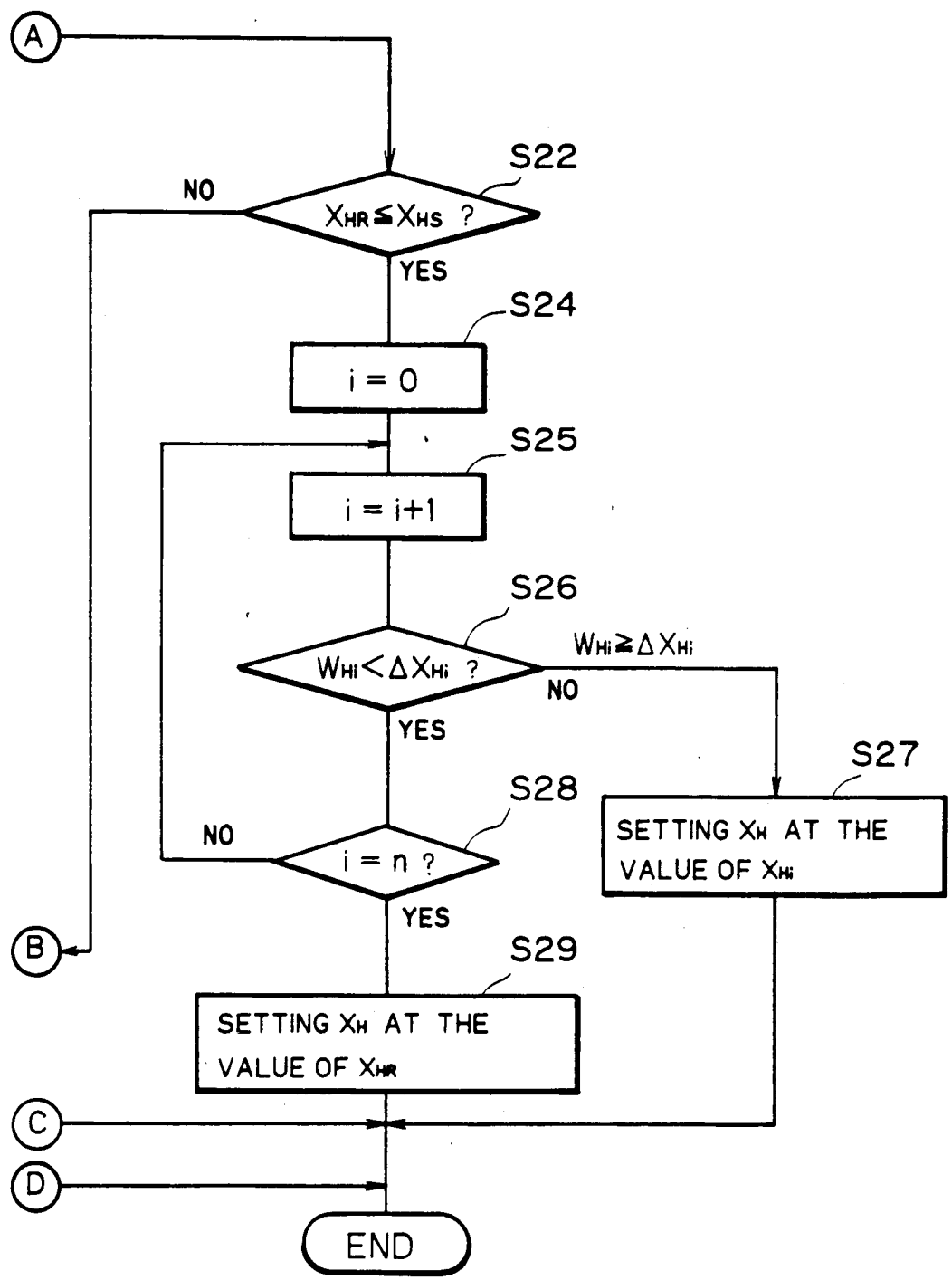

The method of the second embodiment can be applied to another procedure where different processings are performed on, respectively, a normal original, an underexposed original and an overexposed original. FIG. 14 is a flow chart showing this procedure, and it is partly transformed from FIG. 10. Namely, a step S30(S31–S34) is inserted between the step S21 and S22 in FIG. 10. The cumulative histogram h(X) of FIG. 9 is also subjected to the procedure of FIG. 14.

At a step S31 in FIG. 14, a threshold value $W_{HL}$ associated with a minimum RD $X_{HL}$ is calculated by the following equation:

$$W_{HL} = D_H \left( 1 - \frac{Y_{HO} - Y_{min}}{Y_{HL} - Y_{min}} \right) \quad (18)$$

Then, the absolute value of the threshold $W_{HL}$ is compared with that of the difference $\Delta X_{HL}$ ($= X_{HL} - X_{H0}$) at a step S32. The reason why the absolute values are compared in the step S32 is that both the values of $\Delta X_{HL}$ and $W_{HL}$ are negative because relations $X_{HL} < X_{H0}$ and $Y_{HL} < Y_{H0}$ hold. If the absolute value of $\Delta X_{HL}$ is larger than that of $W_{HL}$, the original is processed as a normal one by the steps S22–S29. The value of $\Delta X_{HL}$ expresses a gradient of the histogram H(X) at a density range from $X_{HL}$ to $X_{H0}$ and the step S32 means that the original is processed as a normal one if the gradient is greater than a certain value.

On the other hand, if the gradient is smaller than the certain value, the highlight end portion of the histogram H(X) is gentle to have a wide density range thereabout where the cumulative frequency is fairly low. Hence, the original is subjected to an exceptional processing for an abnormal original. Namely, the minimum RD $X_{HL}$ is first compared with a predetermined threshold density $X_{HLS}$ at a step S33. If the minimum RD $X_{HL}$ is higher than the threshold density $X_{HLS}$, the step S23 is executed such that the minimum RD $X_{HL}$ is selected as the highlight density $X_H$. This is similar to the steps S22 and S23 in FIG. 10. If the minimum $X_{HL}$ is lower than or equal to the threshold density $X_{HLS}$, the highlight density $X_H$ is set at the average value $X_{LR}$ of the minimum RD $X_{HL}$ and the highlight RD $X_{HR}$ at a step S34. It is considered in this procedure that the highlight density $X_H$ would not be set excessively low.

The value $X_{LR}$ may be calculated by the following equation at the step S34:

$$X_{LR} = k X_{HL} + (1-k) X_{HR} \quad (19)$$

where
$0 \leq k \leq 1$.

Although a combination of the methods of the first and second embodiments is used in the third embodiments in order to establish the highlight and shadow densities automatically, those methods can be independently employed to produce separate respective effects. However, if the combination of the methods is used as in the third embodiment, appropriate highlight and shadow densities can be automatically established, whether density character of an original is normal or not. Further, other combinations of the methods of the first and second embodiments are available which are different from that of the third embodiments.

The apparatus used for the present invention is not restricted to the graphic arts scanner shown in FIG. 1, but the present invention may be applicable to other apparatuses such as a drum-type image scanner, facsimile terminal equipment, a copying machine, an image transmission apparatus and the like.

The image data to be processed by the present invention is not restricted to what is obtained through scanning and reading by a graphic arts scanner as described in the present embodiments, but various types of image data such as those obtained by so-called High Definition Television and other apparatuses referred to as New Media, can be also processed by the present invention.

Figure 15:
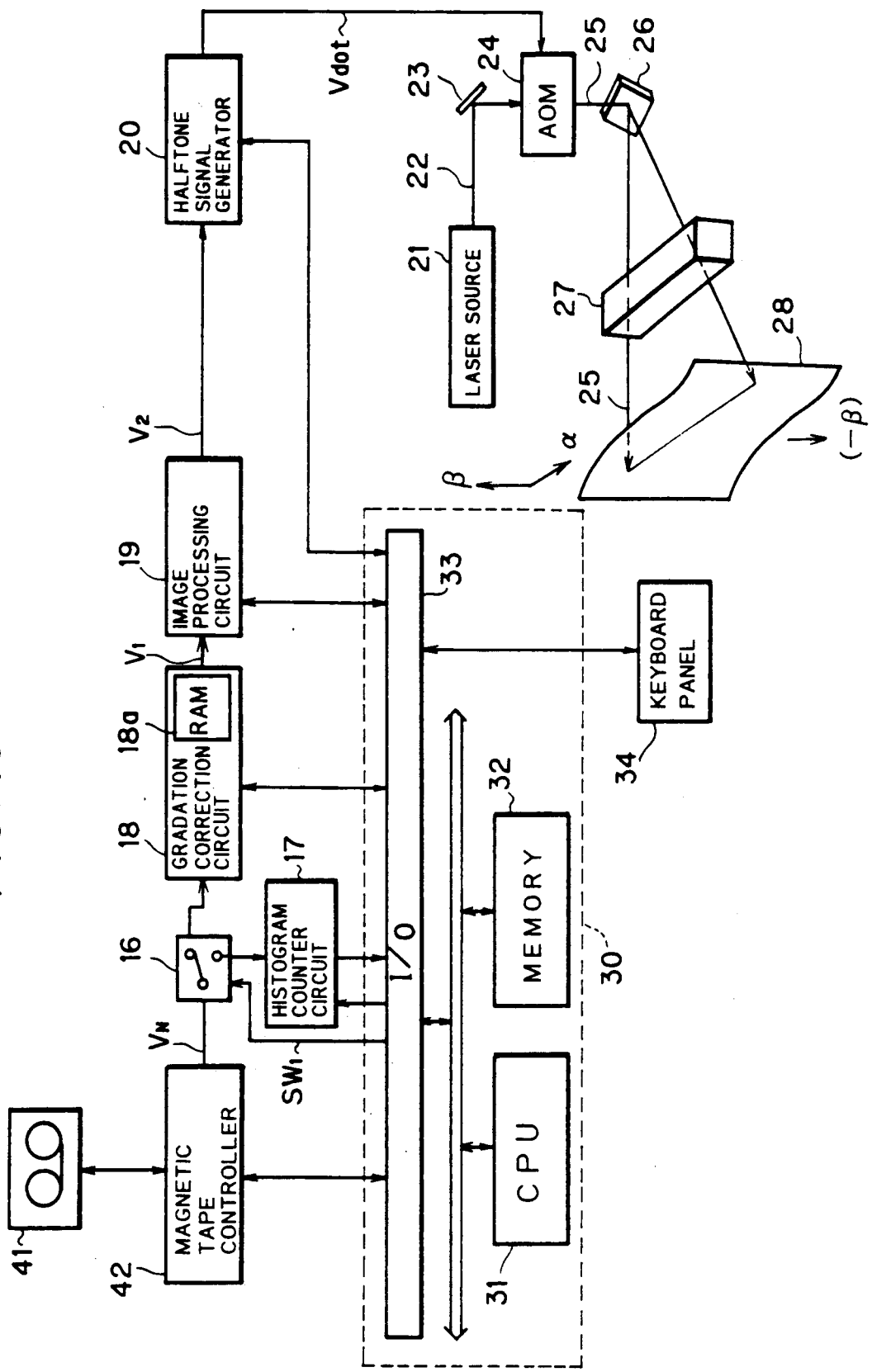
FIG. 15 is a block diagram showing the structure of another apparatus applied to the preferred embodiments of the present invention.

FIG. 15 is a block diagram showing the structure of one of such apparatuses. A magnetic tape 41 stores image data obtained by the other apparatus. The magnetic tape 41 is controlled by the magnetic tape controller 42 to transmit the image data $V_N$ to switching circuit 16 or to the I/O port 33 of the microcomputer 30. That is, the image processing apparatus of FIG. 15 is provided with the magnetic tape 41 and the magnetic tape controller 42 in place of the internal structure of the frame box 1, the A-D converter 14 and the shading correction circuit 15 of the graphic arts scanner shown in FIG. 1; and the other structure of the apparatus is the same as that shown in FIG. 1.

The magnetic tape 41 and the controller 42 may be also replaced by any of magnetic disc, an optical disc, and other memory means with controller and an apparatus for generating image data such as High Definition Television.

According to the present invention, appropriate highlight and shadow densities can be easily established in consideration of density characteristics of an original because the processing procedure is selected on the basis of a certain density of, or a shape of density statistics of, the original.

Further, the present invention does not need manual operation for measuring densities, thereby markedly reducing time and labor of an operator and providing recorded image and reproduced images having invarying quality.

Although the present invention has been described and illustrated in detail, it is clearly understood that the same is by way of illustration and example only and is not to be taken by way of limitation; the spirit and scope of the present invention being limited only by the terms of the appended claims.

What is claimed is:

1. A method of establishing a gradation control density $X_c$ employed as a highlight density or a shadow density on a gradation correction curve $F(X)$ that is used in gradation correction of image data expressing density of each pixel in an image, the method comprising the steps of:
   (a) on the basis of said image data, generating a statistical curve $Y = S(X)$ expressing a cumulative density distribution of said image, where said statistical curve $Y = S(X)$ is defined on an X-Y coordinate plane having an X-axis representing density levels and a Y-axis representing a cumulative number of pixels in an arbitrary scale;
   (b) providing a threshold density $X_{TH}$ on said X-axis;
   (c) finding a terminal value $Y_m$ on said Y-axis at which said statistical curve $Y = S(X)$ is terminated;
   (d) providing a first reference value $Y_{1R}$ on said Y-axis;
   (e) finding a terminal density $X_m$ on said X-axis at which said statistical curve $Y = S(X)$ reaches said terminal value $Y_m$;
   (f) converting said first reference value $Y_{1R}$ through said statistical curve $Y = S(X)$, to thereby obtain a first reference density $X_{1R}$;
   (g) comparing said first reference density $X_{1R}$ with said threshold density $X_{TH}$, to thereby designate said statistical curve $Y = S(X)$ as a first type corresponding to an extraordinarily-bright image or an extraordinarily-dark image when said first reference density $X_{1R}$ is farther from said terminal density $X_m$ than is said threshold density $X_{TH}$, or as a second type corresponding to an ordinary image other than said extraordinarily-bright image or said extraordinarily-dark image when said first reference density $X_{1R}$ is closer to said terminal density $X_m$ than is said threshold density $X_{TH}$;
   (h) selecting a first procedure for setting said gradation control density $X_c$ at a terminal reference density $X_{TR}$ predetermined between said terminal density $X_m$ and said first reference density $X_{1R}$ when said statistical curve $Y = S(X)$ is said first type, or selecting a second procedure other than said first procedure for setting said gradation control density $X_c$ when said statistical curve $Y = S(X)$ is said second type; and
   (i) establishing said gradation control density $X_c$ through said first procedure or said second procedure selected at said step (h).

2. A method in accordance with claim 1, wherein: said terminal reference density $X_{TR}$ is computed by converting a terminal reference value $Y_{TR}$ through said statistical curve $Y = S(X)$, where said terminal reference value $Y_{TR}$ is preset between said terminal value $Y_m$ and said first reference value $Y_{1R}$.

3. A method in accordance with claim 2, wherein said second procedure comprises the steps: of
   (a) presetting a first difference D between said gradation control density $X_c$ and a terminal density $X_a$ of said gradation correction curve $F(X)$;
   (b) finding a line approximate to an end portion of said statistical curve $Y = S(X)$;
   (c) computing a terminal density $X_{im}$ of said line at which said line reaches said terminal value $Y_m$; and
   (d) establishing said gradation control density $X_c$ so that said first difference D agrees within a prescribed error with a second difference $D_i$ between said gradation control density $X_c$ and said terminal density $X_{im}$ of said line.

4. A method in accordance with claim 3, wherein:

said line is a straight line drawn through a first point $P_0$ and a second point $P_i$, where said first point $P_0$ is specified by a combination of a prescribed second reference value $Y_{2R}$ on said Y-axis and a second reference density $X_{2R}$ computed by converting said second reference value $Y_{2R}$ through said statistical curve $Y=S(X)$; and said second point $P_i$ is specified by a combination of a prescribed third reference value $Y_i$ on said Y-axis and a third reference density $X_i$ computed by converting said third reference value $Y_i$ through said statistical curve $Y=S(X)$, while said third reference value $Y_i$ is preset farther from said terminal value $Y_m$ than said second reference value $Y_{2R}$ is.

5. A method in accordance with claim 4, wherein:
said third reference value $Y_i$ and said third reference density $X_i$ include a plurality of candidate values $Y_1$-$Y_n$ and a plurality of candidate densities $X_1$-$X_n$, respectively;
said plurality of candidate values $Y_1$-$Y_n$ are sequentially selected one by one in descending order of differences between said candidate values $Y_1$-$Y_n$ and said terminal value $Y_m$ to specify said second point $P_i$; and a candidate density that is obtained by converting a selected candidate value through said statistical curve $Y=S(X)$ is designated as said gradation control density $X_c$ under the condition that said first differences D agrees within said prescribed error with said second difference $D_i$.

6. A method of establishing a gradation control density $X_c$ employed as a highlight density or a shadow density on a gradation correction curve $F(X)$ that is used in gradation correction of image data expressing density of each pixel in an image, the method comprising the steps of:
 (a) on the basis of said image data, generating a statistical curve $Y=S(X)$ expressing a cumulative density distribution of said image, where said statistical curve $Y=S(X)$ is defined on an X-Y coordinate plane having an X-axis representing density levels and a Y-axis representing a cumulative number of pixels in an arbitrary scale;
 (b) finding a line approximate to an end portion of said statistical curve $Y=S(X)$;
 (c) presetting a first difference D between said gradation control density $X_c$ and a terminal density $X_a$ of said gradation correction curve $F(X)$;
 (d) finding a terminal value $Y_m$ on said Y-axis at which said statistical curve $Y=S(X)$ is terminated;
 (e) computing a terminal density $X_{im}$ of said line at which said line reaches said terminal value $Y_m$; and
 (f) establishing said gradation control density $X_c$ so that said first difference D agrees within a prescribed error with a second difference $D_i$ between said gradation control density $X_c$ and said terminal density $X_{im}$ of said line.

7. A method in accordance with claim 6, wherein
said line is a straight line drawn through a first point $P_0$ and a second point $P_i$, where said first point $P_0$ is specified by a combination of a prescribed first reference value $Y_{2R}$ on said Y-axis and a first reference density $X_{2R}$ computed by converting said first reference value $Y_{2R}$ through said statistical curve $Y=S(X)$, and said second point $P_i$ is specified by a combination of a prescribed second reference value $Y_i$ on said Y-axis and a second reference density $X_i$ computed by converting said second reference value $Y_i$ through said statistical curve $Y=S(X)$, while said second reference value $Y_i$ is preset farther from said terminal value $Y_m$ than said first reference value $Y_{2R}$ is.

8. A method in accordance with claim 7, wherein:
said second reference value $Y_i$ and said second reference density $X_i$ include a plurality of candidate values $Y_1$-$Y_n$ and a plurality of candidate densities $X_1$-$X_n$, respectively;
said plurality of candidate values $Y_1$-$Y_n$ are sequentially selected one by one in descending order of differences between said candidate values $Y_1$-$Y_n$ and said terminal value $Y_m$ to specify said second point $P_i$; and
a candidate density which is obtained by converting a selected candidate value through said statistical curve $Y=S(X)$ is designated as said gradation control density $X_c$ under the condition that said first difference D agrees within said prescribed error with said second difference $D_i$.

9. An apparatus for establishing a gradation control density $X_c$ employed as a highlight density or a shadow density on a gradation correction curve $F(X)$ that is used in gradation correction of image data expressing density of each pixel in an image, the apparatus comprising:
 (a) a first processor means for generating a statistical curve $Y=S(X)$ expressing a cumulative density distribution of said image on the basis of said image data, where said statistical curve $Y=S(X)$ is defined on an X-Y coordinate plane having an X-axis representing density levels and a Y-axis representing a cumulative number of pixels in an arbitrary scale;
 (b) a second processor means for finding a terminal density $X_m$ on said X-axis at which said statistical curve $Y=S(X)$ is terminated;
 (c) a third processor means for computing a first reference density $X_{1R}$ by converting a prescribed first reference value $Y_{1R}$ on said Y-axis through said statistical curve $Y=S(X)$;
 (d) a fourth processor means for comparing said first reference density $X_{1R}$ with a prescribed threshold density $X_{TH}$, to thereby designate said statistical curve $Y=S(X)$ as a first type corresponding to an extraordinarily-bright image or an extraordinarily-dark image when said first reference density $X_{1R}$ is farther from said terminal density $X_m$ than is said threshold density $X_{TH}$, or as a second type corresponding to an ordinary image other than said extraordinarily-bright image or said extraordinarily-dark image when said first reference density $X_{1R}$ is closer to said terminal density $X_m$ than is said threshold density $X_{TH}$; and
 (e) a fifth processor means for establishing said gradation control density $X_c$ through a first procedure for setting said gradation control density $X_c$ at a terminal reference density $X_{TR}$ predetermined between said terminal density $X_m$ and said first reference density $X_{1R}$ when said statistical curve $Y=S(X)$ is said first type, or through a second procedure other than said first procedure for setting said gradation control density $X_c$ when said statistical curve $Y=S(X)$ is said second type.

10. An apparatus in accordance with claim 9, wherein:
said fifth processor means further comprises sub-processor means for executing said second procedure, said sub-processor means including:

(a) a first sub-processor means for substantially finding a line approximate to an end portion of said statistical curve $Y=S(X)$;

(b) a second sub-processor means for computing a terminal density $X_{im}$ at which said line is terminated, and (c) a third sub-processor means for establishing said gradation control density $X_c$ so that a prescribed first difference D between said gradation control density $X_c$ and a terminal density $X_a$ of said gradation correction curve $F(X)$ agrees within a prescribed error with a second difference $D_i$ between said gradation control density $X_c$ and said terminal density $X_{im}$ of said line.

11. An apparatus for establishing a gradation control density $X_c$ employed as a highlight density or a shadow density on a gradation correction curve $F(X)$ that is used in gradation correction of image data expressing density of each pixel in an image, the apparatus comprising:

(a) a first processor means for generating a statistical curve $Y=S(X)$ expressing a cumulative density distribution of said image on the basis of said image data, where said statistical curve $Y=S(X)$ is defined on an X-Y coordinate plane having an X-axis representing density levels and a Y-axis representing a cumulative number of pixels in an arbitrary scale;

(b) a second processor means for finding a line approximate to an end portion of said statistical curve $Y=S(X)$;

(c) a third processor means for computing a terminal density $X_{im}$ at which said line is terminated; and (d) a fourth processor means for establishing said gradation control density $X_c$ so that a prescribed first difference D between said gradation control density $X_c$ and a terminal density $X_a$ of said gradation correction curve $F(X)$ agrees within a prescribed error with a second difference $D_i$ between said gradation control density $X_c$ and said terminal density $X_{im}$ of said line.

* * * * *